United States Patent
Soloviev

(10) Patent No.: US 12,129,616 B2
(45) Date of Patent: Oct. 29, 2024

(54) MITIGATING ADVERSE COASTAL UPWELLING EFFECTS WITH AN ARTIFICIAL DOWNWELLING SYSTEM

(71) Applicant: Alexander V. Soloviev, Hollywood, FL (US)

(72) Inventor: Alexander V. Soloviev, Hollywood, FL (US)

(73) Assignee: Alexander V. Soloviev, Hollywood, FL (US)

( * ) Notice: Subject to any disclaimer, the term of this patent is extended or adjusted under 35 U.S.C. 154(b) by 0 days.

(21) Appl. No.: 18/464,113

(22) Filed: Sep. 8, 2023

(65) Prior Publication Data

US 2024/0084534 A1 Mar. 14, 2024

Related U.S. Application Data

(63) Continuation of application No. PCT/US2023/031796, filed on Sep. 1, 2023.
(Continued)

(51) Int. Cl.
*A01G 15/00* (2006.01)
*E02B 1/00* (2006.01)
*F03B 13/20* (2006.01)

(52) U.S. Cl.
CPC .............. *E02B 1/003* (2013.01); *F03B 13/20* (2013.01)

(58) Field of Classification Search
CPC .......... E02B 1/003; A01G 15/00; F03B 13/20
See application file for complete search history.

(56) References Cited

U.S. PATENT DOCUMENTS 3,683,627 A 8/1972 Girden
4,470,544 A 9/1984 Bronicki et al.
(Continued)

FOREIGN PATENT DOCUMENTS

CN 105494183 A 4/2016
CN 105660491 A 6/2016
(Continued)

OTHER PUBLICATIONS

Antonini, A, CFD investigations of Oxyflux device, an innovative wave pump technology for artificial downwelling of surface water, Dec. 2016, accessed Sep. 1, 2023, https://linkinghub.elsevier.com/retrieve/pii/S0141118716301122.
(Continued)

*Primary Examiner* — Sean D Andrish
(74) *Attorney, Agent, or Firm* — Thompson Patent Law Offices PC

(57) ABSTRACT

An artificial downwelling system, for example, can include one or more free-floating, self-propelled, or anchored wave-inertia pumps. In one embodiment, the wave-inertia pumps may be deployed on the oceanic side of an upwelling front. For example, the wave-inertia pump may pump warm surface water to deeper cold layers (e.g., below a sheared pycnocline of upwelling water) to disrupt the coastal upwelling. In some embodiments, a productivity of the artificial downwelling system can be controlled through remote telemetry, telecommand, and/or electromechanical tools. The artificial downwelling system may, for example, be powered by wave energy, and can be controlled using a telemechanical system powered by wind energy, and/or solar panel energy backed by electrical batteries.

13 Claims, 11 Drawing Sheets

Related U.S. Application Data

(60) Provisional application No. 63/405,467, filed on Sep. 11, 2022.

(56) References Cited

U.S. PATENT DOCUMENTS

| | | | |
|---|---|---|---|
| 5,492,274 A | 2/1996 | Assaf et al. | |
| 7,536,967 B2* | 5/2009 | Barber | E02B 1/003 114/151 |
| 8,342,818 B2 | 1/2013 | Windle | |
| 8,602,682 B2 | 12/2013 | Resler | |
| 8,668,472 B2 | 3/2014 | Tillotson | |
| 8,715,496 B2* | 5/2014 | Bowers | A01G 15/00 417/334 |
| 10,687,481 B2 | 6/2020 | Soloviev et al. | |
| 10,973,182 B1* | 4/2021 | Bangerter | A01G 25/167 |
| 2002/0009338 A1 | 1/2002 | Blum et al. | |
| 2005/0031417 A1 | 2/2005 | Hofer et al. | |
| 2007/0270057 A1 | 11/2007 | Feldman et al. | |
| 2008/0082268 A1 | 4/2008 | Soloviev et al. | |
| 2009/0173404 A1 | 7/2009 | Bowers et al. | |
| 2009/0272817 A1 | 11/2009 | Blum et al. | |
| 2010/0270389 A1 | 10/2010 | Feldman | |
| 2010/0300560 A1 | 12/2010 | Bowers et al. | |
| 2011/0067641 A1 | 3/2011 | Kithil | |
| 2015/0276597 A1* | 10/2015 | Hamilton | G01N 21/538 239/14.1 |
| 2016/0168522 A1 | 6/2016 | Krenbrink et al. | |
| 2018/0045166 A1* | 2/2018 | Mundon | H02K 7/1876 |
| 2018/0313049 A1* | 11/2018 | Morelli | C02F 1/40 |
| 2019/0128068 A1 | 5/2019 | Danko | |
| 2019/0265387 A1* | 8/2019 | Tyagi | F03D 9/00 |
| 2019/0307080 A1 | 10/2019 | Soloviev et al. | |
| 2020/0182218 A1 | 6/2020 | Sheldon-Coulson et al. | |
| 2022/0355905 A1* | 11/2022 | Lynn | B63H 11/04 |
| 2023/0053123 A1 | 2/2023 | Sung et al. | |

FOREIGN PATENT DOCUMENTS

| | | |
|---|---|---|
| CN | 105918230 A | 9/2016 |
| CN | 106438177 A | 2/2017 |
| CN | 110720424 B | 11/2020 |
| CN | 114814276 A | 7/2022 |
| DE | 10342853 A1 | 4/2005 |
| WO | 2011021992 A1 | 2/2011 |
| WO | 2011029624 A2 | 3/2011 |
| WO | 2021028761 A1 | 2/2021 |
| WO | 2023064096 A1 | 4/2023 |

OTHER PUBLICATIONS

Beghoura, et al, Contrasting responses of the ocean's oxygen minimum zones to artificial re-oxygenation, IOPScience, Jul. 17, 2023, accessed Sep. 1, 2023, https://iopscience.iop.org/article/10.1088/1748-9326/ace0cd.

Davy-Bowker, et al, A new experimental facility to generate artificial up and downwelling zones, 2007, accessed Sep. 1, 2023, https://www.semanticscholar.org/paper/A-new-experimental-facility-to-generate-artificial-Davy-Bowker-Corbin/3ae63d365c6262d0ed713cb6c1376f5511d217ca.

Fan, et al, Experimental Study on the Effects of a Vertical Jet Impinging on Soft Bottom Sediments, May 6, 2020, accessed Sep. 1, 2023, https://www.mdpi.com/2071-1050/12/9/3775.

Fan, et al, Experimental Study on the Performance of an Innovative Tide-Induced Device for Artificial Downwelling, MDPI, Sep. 25, 2019, accessed Sep. 1, 2023, https://www.mdpi.com/2071-1050/11/19/5268.

Feng, et al, Geoengineered Ocean Vertical Water Exchange Can Accelerate Global Deoxygenation, Jul. 29, 2020, accessed Sep. 1, 2023, https://onlinelibrary.wiley.com/doi/abs/10.1029/2020GL088263.

Geoengineering Monitor, Artificial Upwelling, Jun. 2018, accessed Sep. 1, 2023, https://www.geoengineeringmonitor.org/wp-content/uploads/2018/06/Geoengineering-factsheet-Upwelling.pdf.

Ikenson, B, Wave-Powered Water Pumps Could Become a New Source of Clean Energy, Oct. 25, 2017, accessed Sep. 1, 2023, https://www.popularmechanics.com/science/green-tech/news/a28767/water-pumps-driven-wave-energy-clean-energy/.

Jobb, G,Wave Pump Optimisation Study, Apr. 4, 2014, accessed Sep. 1, 2023, https://treefinder.de/Ideas/Wave_Pump_Optimization_Study.pdf.

Kim, et al, The Variation of Current by the Building of Artificial Upwelling Structure ( I ), 2006, accessed Sep. 1, 2023, https://www.semanticscholar.org/paper/The-Variation-of-Current-by-the-Building-of-(-I-)-Kim-Hwang/ba14e7056834f23c04c694c053ea0925a2f31e73.

Knaus, C, Plan to pump cold water on to Barrier Reef to stop bleaching labelled 'band-aid', Apr. 6, 2017, accessed Sep. 1, 2023, https://www.theguardian.com/environment/2017/apr/07/plan-cold-water-barrier-reef-stop-bleaching.

Lin, et al, The CFD simulation and experiment of a venturi-type artificial downwelling device, Oct. 2018, accessed Sep. 1, 2023, https://ieeexplore.ieee.org/document/8604756.

Liu, et al, Review of Artificial Downwelling for Mitigating Hypoxia in Coastal Waters, Oct. 13, 2020, accessed Sep. 1, 2023, https://www.mdpi.com/2073-4441/12/10/2846.

Malakar, et al, Ingesting Land Surface Temperature differences to improve Downwelling Solar Radiation using Artificial Neural Network: A Case Study, 2007, accessed Sep. 1, 2023, https://www.semanticscholar.org/paper/Ingesting-Land-Surface-Temperature-differences-to-A-Malakar-Bailey/c427787a09b50360fe5648e24b15c8a462e85f0a.

McDill, S, 'Cloud brightening' experiment may help cool Great Barrier Reef, Apr. 22, 2023, accessed Sep. 1, 2023, https://www.reuters.com/article/us-earth-day-reef-cooling-idUSKCN2240ZC.

Riebesell, U, Ocean artificial upwelling, Oct. 2, 2020, accessed Sep. 1, 2023, https://www.geomar.de/en/research/fb2/fb2-bi/research-topics/ocean-artificial-upwelling/.

Saving the Great Barrier Reef, Marine Cloud Brightening for the Great Barrier Reef-Cooling the Reef, Oct. 2, 2020, accessed Sep. 1, 2023, https://www.savingthegreatbarrierreef.org/cooling-the-reef.

Sawall, et al, Discrete Pulses of Cooler Deep Water Can Decelerate Coral Bleaching During Thermal Stress: Implications for Artificial Upwelling During Heat Stress Events, Aug. 28, 2020, accessed Sep. 1, 2023, https://www.frontiersin.org/articles/10.3389/fmars.2020.00720.

White, et al, An Open Ocean Trial of Controlled Upwelling Using Wave Pump Technology, Feb. 1, 2010, accessed Sep. 1, 2023, https://journals.ametsoc.org/view/journals/atot/27/2/2009jtecho679_1.xml.

Xiao, et al, On the total entrained flow rate of artificial downwelling, Jun. 1, 2019, accessed Sep. 1, 2023, https://www.sciencedirect.com/science/article/pii/S0029801819301635.

Xiao, et al, A tidal pump for artificial downwelling: Theory and experiment, Mar. 1, 2018, accessed Sep. 1, 2023, https://www.sciencedirect.com/science/article/pii/S0029801817308041.

Xiao, et al, Could Artificial Downwelling/Upwelling Mitigate Oceanic Deoxygenation in Western Subarctic North Pacific?, Sep. 10, 2021, accessed Sep. 1, 2023, https://www.frontiersin.org/articles/10.3389/fmars.2021.651510.

Yao, et al, Numerical Studies on the Suitable Position of Artificial Upwelling in a Semi-Enclosed Bay, Jan. 8, 2020, accessed Sep. 1, 2023, https://www.mdpi.com/2073-4441/12/1/177.

Yiwen, et al, Research progress in artificial upwelling and its potential environmental effects, Dec. 9, 2015, accessed Sep. 1, 2023, https://www.researchgate.net/profile/Yanan-Di/publication/286529279_Research_progress_in_artificial_upwelling_and_its_potential_environmental_effects/links/5f1b7969299bf1720d6262b3/Research-progress-in-artificial-upwelling-and-its-potential-environmental-effects.pdf.

Zhang, et al, Avoiding the "Great Filter": An assessment of climate change solutions and combinations for effective implementation, Frontiers in Climate, Dec. 2, 2022, accessed Sep. 1, 2023, https://www.frontiersin.org/articles/10.3389/fclim.2022.1042018/full.

(56) References Cited

OTHER PUBLICATIONS

Zhou, et al, Geoengineering Downwelling Ocean Currents: A Cost Assessment, 2005, accessed Sep. 1, 2023, http://link.springer.com/10.1007/s10584-005-5933-0.

* cited by examiner

MITIGATING ADVERSE COASTAL UPWELLING EFFECTS WITH AN ARTIFICIAL DOWNWELLING SYSTEM

CROSS-REFERENCE TO RELATED APPLICATIONS

This application claims the benefit of U.S. Provisional Application Ser. No. 63/405,467, titled "Mitigating Adverse Coastal Upwelling Effects with an Artificial Downwelling System," filed by Alexander V. Soloviev, on Sep. 11, 2022.

This application is also a Continuation of and claims the benefit of PCT Application Serial No. PCT/US23/31796, titled "Mitigating Adverse Coastal Upwelling Effects with an Artificial Downwelling System," filed by Alexander V. Soloviev on Sep. 8, 2023, which application claims the benefit of U.S. Provisional Application Ser. No. 63/405,467, titled "Mitigating Adverse Coastal Upwelling Effects with an Artificial Downwelling System," filed by Alexander V. Soloviev, on Sep. 11, 2022.

This application incorporates the entire contents of the foregoing application herein by reference.

The subject matter of this application may have common inventorship with and/or may be related to the subject matter of the following:

U.S. patent application Ser. No. 16/381,355, titled "Method And Means For Storing Heat In The Sea For Local Weather Modification," filed by Alexander V. Soloviev, et al., on Apr. 11, 2019, issued as U.S. Pat. No. 10,687,481 on Jun. 23, 2020.

This application incorporates the entire contents of the foregoing application(s) herein by reference.

TECHNICAL FIELD

Various embodiments relate generally to a system and method for controlling regional and local ocean climates.

BACKGROUND

Wind blowing over any large water body on the rotating planet Earth can push surface water away from the coast by the process known as the Ekman transport. The Ekman transport can occur in the ocean, seas, lakes, or other large bodies of water. The Ekman transport is at right angles to the wind direction, to the right in the Northern Hemisphere and to the left in the Southern Hemisphere.

In the Northern Hemisphere along a coastline, oriented North-South, like much of the west California coast of the U.S., winds that blow from the north tend to drive ocean surface currents to the right of the wind direction, thus pushing the surface water offshore. Deep, cold water then rises to replace the surface water that was pushed away by the Ekman transport. This process, known as the coastal upwelling, is schematically shown in FIGS. 1A-B and in more detail in FIGS. 2A-D and FIG. 3. The coastal upwelling typically occurs if the wind is parallel to the coastline (FIG. 1A, FIG. 2A) while the coast is on the left side in the Northern Hemisphere or on the right side in the Southern Hemisphere relative to the wind direction.

The offshore movement of surface water by the Ekman transport (FIG. 1B, FIG. 2A, and FIG. 2C) leads to a lowering of sea-level towards the coast (FIGS. 2B and 2D). This results in a landward horizontal pressure gradient, which in turn generates a geostrophic flow towards the Equator (FIG. 2C). This geostrophic flow is known as the upwelling jet. The upwelling jet, combined with the offshore wind-driven current, results in a surface current directed offshore and towards the Equator (FIG. 2C). There are also upward-sloping isobars and northerly flow below the layer of zero current (FIG. 2D, FIG. 3). (After Collins 2001.)

Though the upwelling is typically most prominent in the ocean and seas, this disclosure is also applicable to other large bodies of water on the planet Earth.

FIG. 3 schematically shows the typical vertical structure of a coastal ocean upwelling; a pycnocline 305 separates the warmer near-surface water from the colder upwelling water. A surface feature of the pycnocline 305 is the upwelling front on the sea surface, which can be either relatively narrow or several tens of kilometers wide.

Note that the warmer surface water and the colder deep water in the undercurrent jet are moving at different speeds and directions, which results in a current velocity shear across the pycnocline 305 and the layer of zero current (FIG. 2D, FIG. 3). Strong density stratification in the pycnocline 305 suppresses turbulent mixing across the pycnocline 305, which permits upwelling water to propagate towards the coastline with relatively low friction on the upper boundary of the upwelling water. The pycnocline 305, however, is only marginally stable and periodically, on time scales of days to weeks, becomes unstable (Kaempf and Chapman 2016.)

"Depending on the strength of the upwelling event, the wind stress causes the density interface (e.g., the pycnocline 305) to rise toward the coast. The pycnocline 305 however may or may not eventually reach the sea surface, resulting in either partial upwelling or full upwelling (Csanady 1977). Partial upwelling results in a sloping density interface which does not reach the surface. Full upwelling, on the other hand, results in the formation of a surface density front, which is a relatively narrow frontal zone across which seawater density changes rapidly, also referred to as the upwelling front." (Kaempf and Chapman 2016.)

The coastal upwelling dynamics can be grouped into different regimes (FIG. 4). Oceanic influences (e.g., the upward tilt of the large nutricline on the eastern side of subtropical gyres, or localized onshore flows in submarine shelf-break canyons) are preconditions for coastal upwelling as they import nutrient-rich waters onto the shelf. The actual wind-driven coastal upwelling process takes place on the central parts of the continental shelf and follows from upwelling-favorable (i.e., coast-parallel) wind stresses. This upwelling excludes near-shore regions of the shelf in which the water is too shallow (depth <50 m) for the development of spatially separated surface and bottom Ekman layers. Here, the Ekman layers overlap and create water movements that are more aligned with the wind direction. Turbulence mixes waters from the main upwelling zone into nearshore waters. (Kaempf and Chapman 2016.)

The abrupt change in coastline orientation at Pt. Conception creates a sharp transition between upwelling regions to the north of the Point and warmer waters of the Santa Barbara Channel (FIG. 5).

Note that the coastal upwelling schematics in FIGS. 1A-B, FIGS. 2A-D, and FIG. 3 are an idealized representation of a steady-state situation, assuming a fully developed Ekman transport at right angles to the wind. The coastal upwelling occurs in response to wind events. Thus, the actual pattern of isopycnals and along-shore current flow varies from time to time, depending on the direction and strength of the wind, and is also affected by local factors like the topography of the seabed and the shape of the coastline.

As a result, upwelling fronts tend to develop wave-like instabilities, eddies, and filaments. The California upwelling is an example (FIG. 5).

Depending on typical wind conditions in a region, coastal upwelling can be either a quasi-permanent feature in so-called major coastal upwelling systems or a seasonal feature in seasonal coastal upwelling systems. Coastlines and sea-floors are frequently irregular, wind-driven coastal upwelling events are generally localized, and upwelling is not at all uniform. Consequently, upwelling is more pronounced in certain regions, called upwelling centres, than in others. Pt. Reyes is an example of the upwelling centre (FIG. 5). Upwelling centres are often associated with strong frontal flows related to the upwelling jet that breaks up into mesoscale, 10-20 km size in coastal waters, circular circulation patterns called eddies.

While most of the primary biological productivity takes place inside and a short distance downstream of coastal upwelling centres, more quiescent regions adjacent to upwelling centres, called upwelling shadows, are important as spawning and nursery grounds for pelagic fish. (Kaempf and Chapman 2016.)

Upwelling jets are not smooth (laminar) flows. The upwelling pycnocline is only marginally stable and upwelling jets quickly become hydrodynamically unstable on time scales of days to weeks and shed mesoscale eddies. This natural mechanism results in periodic local disruptions of the coastal upwelling, which reduces and thus regulates its strength.

Worldwide (FIG. 6), there are major eastern boundary coastal upwelling systems off the coasts of Oregon and California (California Upwelling), Peru and Chile (Peruvian Upwelling), Southwest Africa (Benguela Upwelling), and Northwest Africa and Portugal (Northwest African and Portugal/NW Spain Upwelling). The respective upwelling jets are associated with the California Current, the Humboldt Current, the Benguela Current, and the Canary Current. These four eastern boundary currents include the most intense coastal upwelling zones in the oceans. (Kaempf and Chapman 2016.)

There is also a strong seasonal upwelling system off Somalia and Oman, which is associated with the Somali Current. There is a seasonal upwelling system off Australia, associated with the West Australian Current. There are also wind-induced seasonal upwelling systems off the coasts off New Zealand, Sumatra, along the southwest coast of India, in the South China Sea, in the East China Sea, Arafura Sea, and in some other places. (FIG. 6.)

The Benguela Current is the eastern boundary of the South Atlantic subtropical gyre and can be divided into northern and southern subsystems with upwelling occurring in both areas. The subsystems are divided by an area of permanent upwelling off Luderitz, Namibia, which is the strongest upwelling zone in the world. The California Current System (CCS) is an eastern boundary current of the North Pacific that is also characterized by a north and south split. The split in this system occurs at Point Conception, California due to weak upwelling in the south and strong upwelling in the north. The Canary Current is an eastern boundary current of the North Atlantic Gyre and is also separated due to the presence of the Canary Islands. Finally, the Humboldt Current or the Peru Current flows west along the coast of South America from Peru to Chile and extends up to 1,000 kilometers offshore.

The climatological importance of a coastal upwelling lies in the fact that it usually replenishes surface waters with deep cold water, reducing the sea surface temperature in the coastal areas influenced by upwelling. The reduced sea surface temperature in the areas influenced by upwelling suppresses evaporation and lowers the presence of moisture in the air. Dry air is less favorable for the formation of rain clouds and rains. Typically, associated with coastal ocean upwellings are arid and semi-arid climate zones 705 (FIG. 7A).

The coastal arid and semi-arid regions 710 that are associated with the coastal upwelling (FIG. 7A) are largely unpopulated due to desert type climate (FIG. 7B). These coastal arid and semi-arid regions 710 typically have ample surface wave energy (FIG. 7C), which creates favorable conditions for the application of wave-inertial pumps.

Coastal upwellings bring cold water and produce dry surrounding air masses. Dry air is a cause of forest fires in the coastal areas affected by the coastal upwelling. An example is the California fires (FIG. 8). The abrupt change in coastline orientation at Pt. Conception creates a sharp transition between upwelling regions to the north of the Point and warmer waters of the Santa Barbara Channel (FIG. 5). Note corresponding reduction of forest fires in the coastal areas south of Pt. Conception (FIG. 8).

Harmful algal blooms and hypoxia (though are not limited to upwelling regions) do develop more frequently in the coastal upwelling areas due to high concentrations of nutrients in the upwelling water. Upwelling shadows, downstream of upwelling centres, can contain favorable conditions for the development of red tides and other harmful algae. (Kaempf and Chapman 2016.)

SUMMARY

This disclosure describes a method and means for mitigating adverse coastal ocean upwelling effects, including an artificial downwelling system injecting the surface water in the upwelling water to disrupt said upwelling, which will promote green infrastructure and agriculture, reduce incidences of forest fires in the related arid and semi-arid coastal regions, and mitigate the incidences of harmful algal blooms.

In another aspect, the artificial downwelling system may include a wave-inertia pump or a plurality (cluster) of wave-inertia pumps, each pipe extending downwards from the surface layer to the layer of the upwelling water.

In another aspect, the artificial downwelling system deployed on the warmer oceanic side of the upwelling front delivers warmer and therefore less dense surface water to colder and therefore denser upwelling waters below the sheared pycnocline to trigger convective-shear hydrodynamic instability, which disrupts the coastal upwelling.

In another aspect, the artificial downwelling system is geographically concentrated near upwelling centres.

In another embodiment, the artificial downwelling systems including a cluster of wave-inertia pumps will be concentrated in the vicinity of upwelling centres, outside of upwelling filaments.

In another aspect, the wave-inertia pump has an additional one or more side outlets injecting the surface water in upwelling waters below the pycnocline and in the undercurrent jet below the layer of zero current (FIG. 10C).

In another aspect, productivity of the wave-inertia pump (downward waterflow and its distribution between outlets) is preset before the deployment at sea.

In another aspect, the productivity of the wave-inertia pump (downward waterflow speed) can be regulated by pressure reducing or pressure limiting valves controlled through remote telemetry, telecommand, or electromechanical tools powered by wave energy, wind energy, or solar panel energy backed by electrical batteries.

In another aspect, the productivity of the artificial downwelling system is controlled with telecommand tools based on oceanographic and atmospheric in-situ and remote sensing data in the coastal ocean upwelling area such as the upwelling index (Bakun 1973), the lowering of the coastal sea level induced by the offshore Ekman transport, satellite derived sea surface temperature, and Ocean Color satellite products.

In another aspect, to preserve fishery while mitigating arid and semi-arid climates in coastal areas, the artificial downwelling will reduce a full upwelling to the partial upwelling.

In yet another aspect, a machine learning model will optimize the control of the coastal ocean upwelling productivity based on in-situ and remote sensing techniques collecting the environmental data.

These and other aspects, features, and advantages from the present disclosure will become more readily apparent from the attached drawings and the detailed description of the preferred embodiments.

The details of various embodiments are set forth in the accompanying drawings and the description below. Other features and advantages will be apparent from the description and drawings, and from the claims.

BRIEF DESCRIPTION OF THE DRAWINGS

FIG. 1A shows a plan view of North winds along a west coast in the Northern Hemisphere causing the Ekman transport of surface water away from the shore. FIG. 1B shows a cross-section view of the surface water transported offshore being replaced by the upwelling of cold water from deep ocean layers.

FIG. 2A depicts an exemplary initial stage: wind stress along the shore causes surface transport 45° to the right of the wind, and Ekman transport (average motion in the wind-driven layer) 90° to the right of the wind. FIG. 2B depicts an exemplary cross-section to illustrate the effect of conditions in FIG. 2A. For example, the divergence of surface waters away from the land leads to their replacement by upwelled subsurface water, and to a lowering of sea-level towards the coast. FIG. 2C depicts an exemplary result at the sloping sea surface that there is a horizontal pressure gradient directed towards the land (black arrows in FIG. 2D) and a geostrophic current develops 90° to the right of this pressure gradient. This 'slope' current flows along the coast and towards the Equator. The resultant surface transport, i.e., the transport caused by the combination of the surface transport at 45° to the wind stress and the slope current, still has an offshore component so upwelling continues. FIG. 2D depicts an exemplary cross-section to illustrate the variation with depth of density (the blue lines are isopycnals) and pressure (the dashed black lines are isobars, and the horizontal arrows represent the direction and relative strength of the horizontal pressure gradient force). Isopycnals slope up towards the shore as cooler, denser water wells up to replace warmer, less dense surface water. The shoreward slope of the isobars decreases progressively with depth until they become horizontal; at this depth, the horizontal pressure gradient force is zero, and so the velocity of the geostrophic current is also zero. At greater depths, isobars slope up towards the coast indicating the existence of a northerly flow; a deep countercurrent is a common feature of coastal upwellings.

Like reference symbols in the various drawings indicate like elements.

DETAILED DESCRIPTION OF ILLUSTRATIVE EMBODIMENTS

Figure 1B:
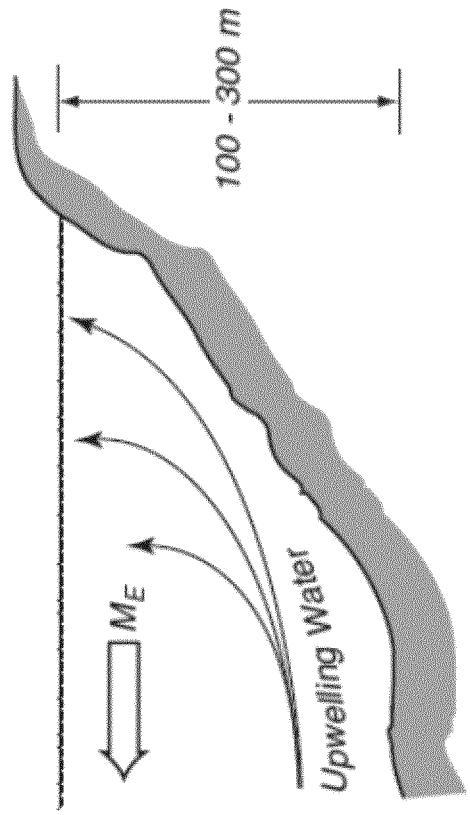
FIG. 1A and FIG. 1B are simplified sketches of Ekman transport along a coast leading to the upwelling of cold water along the coast (Stewart 2008).
Figure 1A:
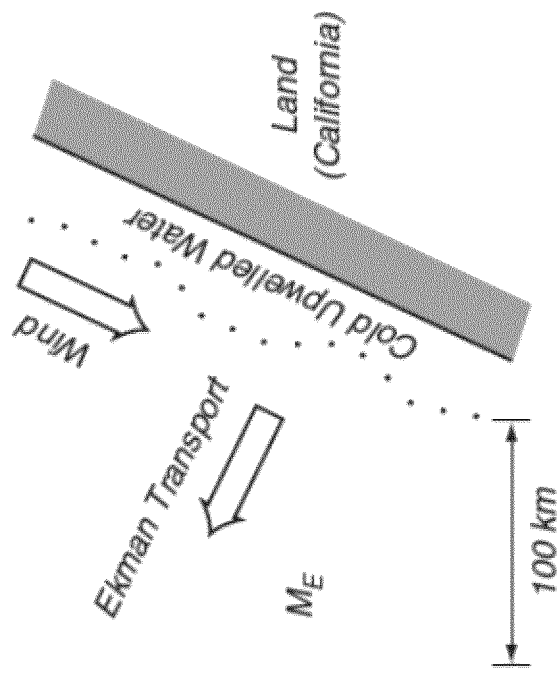

This disclosure describes a method and means for controlling the coastal ocean upwelling by creating the artificial downwelling supplying the surface water to deeper layers thereby triggering disruption of the coastal upwelling.

Detailed embodiments are disclosed herein; however, it is to be understood that the disclosed embodiments are merely examples and that the systems and methods described below can be embodied in various forms. Therefore, specific structural and functional details disclosed herein are not to be interpreted as limiting, but merely as a basis for the claims and as a representative basis for teaching one skilled in the art to variously employ the present subject matter in virtually any appropriately detailed structure and function. Further, the terms and phrases used herein are not intended to be limiting, but rather, to provide an understandable description of the concepts.

The terms "a" or "an", as used herein, are defined as one or more than one. The term plurality, as used herein, is defined as two or more than two. The term another, as used herein, is defined as at least a second or more.

According to the NOAA definition, the term upwelling stands for a process in which deep, cold water rises toward the surface. In this disclosure, the term upwelling is reserved for the wind-driven coastal upwelling on a shelf (see, e.g., Longdill and Healy, 2008). This term can interchangeably be used in combinations like coastal upwelling or coastal ocean upwelling. The terms upwelling front or just front are used here intermittently and refer to the upwelling density front that is typically associated with the upwelling temperature front. In the case of full upwelling, such the front also has a surface feature.

In this disclosure, the term artificial downwelling refers to the technology that uses artificial methods to make water flow from the uppermost layer of a body of water to deeper layers. Various embodiments of systems and methods for artificial downwelling are disclosed with reference to U.S. Pat. No. 10,687,481, titled "Method And Means For Storing Heat In The Sea For Local Weather Modification, of which the inventor of this application is also listed as a co-inventor. This application incorporates the entire contents of the foregoing application(s) herein by reference.

The upper ocean mixed layer, the ocean region adjacent to the air-sea interface, is typically tens of meters deep and is often well mixed; as a result, the temperature, salinity, and density are fairly uniform. The rapidly changing regions below these uniform regions are called the thermocline, halocline, or pycnocline (Kantha and Clayson 2002). In the case of a coastal ocean upwelling, the thermocline, halocline, and pycnocline are typically tilted.

The term western boundary current refers here to strong, warm, and persistent currents along the western boundaries of the world's major ocean basins. The Gulf Stream is an example. The term eastern boundary current refers here to relatively wide, slow, and persistent currents along the eastern boundaries of the world's major ocean basins. The California Current is an example. Major wind upwellings are found on the eastern side of oceans and seas.

A hydrodynamic instability in the ocean or any bodies of water may occur when there is a velocity shear (a change in velocity at right angles to the direction of the flow) either in a homogeneous fluid, or where there is a velocity difference between two fluids with a difference in density, for example, across the pycnocline. A pycnocline with the velocity difference will further be referred to as the sheared pycnocline. For coastal upwellings, the hydrodynamic instability developed in the sheared pycnocline may involve several modes including the Kelvin-Helmholtz type instability. The latter leads to increased turbulent mixing and friction in the water column, which trigger the hydrodynamic instability of the upwelling jet.

Upwelling jets contain significant kinetic and potential energy but are not smooth (laminar) flows. Consequently, upwelling jets are often only marginally stable, which means that they can be destabilized by a relatively small impact. The sheared upwelling pycnocline, as well as the upwelling jet flowing above this pycnocline, quickly become hydrodynamically unstable on time scales of days to weeks and shed mesoscale eddies (e.g., Aristegui et al. 1997, Kaempf and Chapman 2016). The mesoscale eddies in the coastal ocean can have diameters of 10-20 km, in contrast to the more commonly known open-ocean eddies that have diameters of up to 300 km. As a result of upwelling jet hydrodynamic instability and eddy shedding, the width of the upwelling zone generally increases along the coast in the direction of the upwelling jet. Fully developed eddy fields exhibit specific pathways, called filaments, along which upwelled water is advected offshore. Filaments, which can be quasi-stationary or transient features, generally operate as an export mechanism of the upwelled water to the open ocean. Filaments and eddies move and disperse cold water anomalies of the upwelling offshore and mix with surrounding warm waters. This natural mechanism regulates the coastal upwelling intensity.

This disclosure provides a method and means for the regulation of the strength of a coastal upwelling by triggering more frequent upwelling disruptions compared to how often they occur naturally. This method and means for the man-made regulation of a coastal upwelling include an artificial downwelling system intended for periodic destabilization and disruption of said coastal upwelling.

The artificial downwelling can be produced by the wave-inertia pump described in U.S. Pat. No. 10,687,481 with the innovations described later in this disclosure. U.S. Pat. No. 10,687,481 was to store the warm water supplied by wave-inertia pumps during the summer season in a calm near-bottom layer of the ocean with stable hydrodynamics and minimum mixing with surrounding waters to be stored in this layer until the winter season. In this disclosure, the wave-inertia pumps have a different function, which is to disrupt the coastal upwelling.

Figure 9:
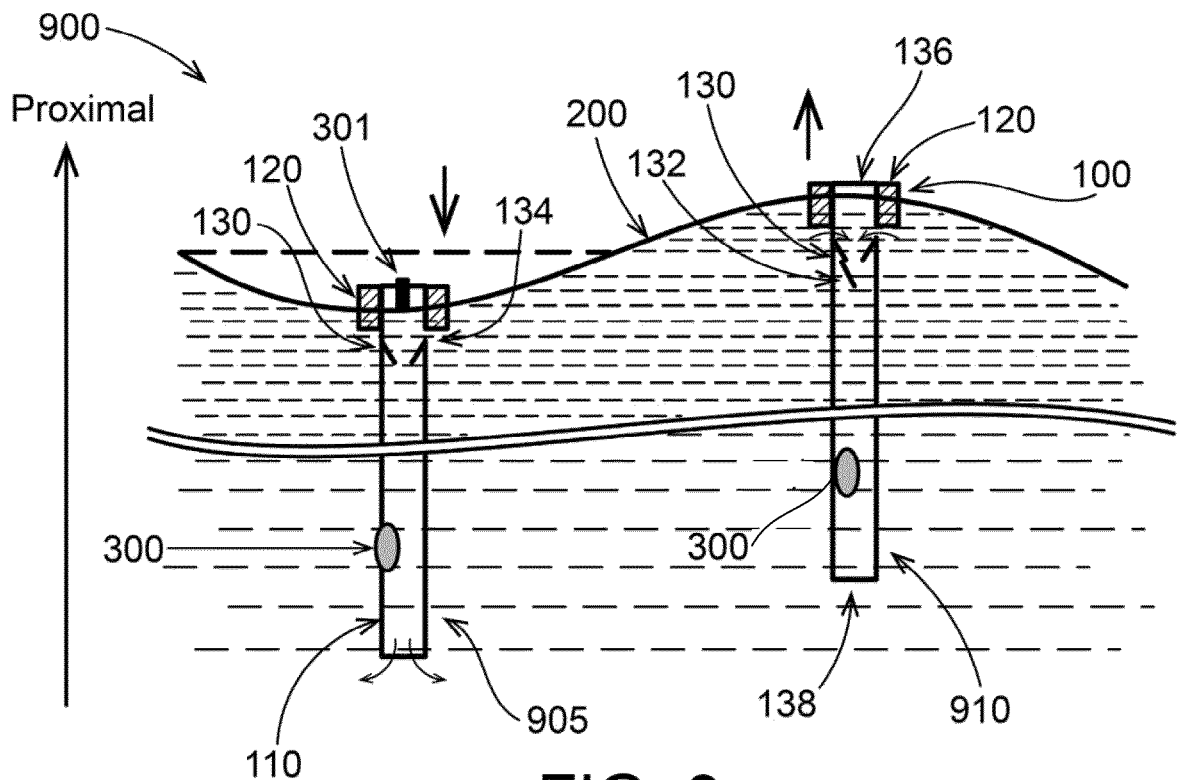
FIG. 9 depicts exemplary wave-inertia pumps 100 deployed in the coastal ocean upwelling zone with an option of one or more additional outlets 134 and a pressure reducing or pressure limiting valves (PROPLVs 301) that can be controlled electromechanically through a remote telecommand tool.

The artificial downwelling can be created by a moored, drifting, or self-propelled wave-inertia pump or a plurality of the wave-inertia pumps. With reference to FIG. 9, an artificial downwelling system (ADS 900) includes two wave inertia pumps 905, 910. In this example, the wave-inertia pump 905 is coupled to a pipe 110 at a proximal end. For example, the pipe 110 may be disposed within the water body 200 to extend from the surface to the deep water in the range from 10 to 200 meters. The upper surface of the pipe is connected to a buoyant flotation device or flotation materials 120. As shown, the pipe 110 further includes one or more one-way valves 130 which are oriented to allow water flow within the pipe substantially downwards only. In this embodiment, a pivoting stop 132 is shown. In some embodiments, other valve structures can be used as understood within the art of hydraulic valves. The pipe 110 can be oriented vertically to present the shortest path of deep water, although pipe 110 may be disposed temporarily or almost permanently at an angle due to the force of currents or other environmental conditions. The pipe 110 can be manufactured from any known material that has sufficient strength and durability in seawater for example including metal, plastic, fiberglass, carbon fiber, or composite material. The pipe 110 can be manufactured in sections, for example using materials and methods used for underground drilling beneath water bodies. The flotation materials 120 are affixed near the top of the pipe 110 as depicted in FIG. 9, or they may be positioned at other locations along the length of the pipe 110 to dispose the upper region 136 of pipe 110 at a desired position relative to the surface of the water body.

For the specific application here, the wave-inertia pump 905 can include, as new elements, one or more optional side outlets 300 and one or more pressure reducing or pressure limiting valves (e.g., PRoPLVs 301) installed on the upper region 136 of the pipe 110 or elsewhere on the pipe 110. The PRoPLVs 301, for example, can be controlled electromechanically through remote telecommand tools thereby regulating the discharge of the downwelling water through a main pump outlet 138 (e.g., attached at a distal end of the pipe 110) and the side outlets 300. For example, the pipe 110 may be longitudinally extending from the PRoPLVs 301 towards the main pump outlet 138. A single or plurality of remotely controlled pressure reducing or pressure limiting valves (e.g., the PRoPLVs 301) can also be installed in other parts of the pipe 110.

The wave-inertia pumps 905, 910 may move the surface water to deeper layers. The amount of water pumped corresponds to the vertical displacement of the pipe due to movement of flotation materials 120 by surface waves and the diameter of the pipe, among other factors. Remarkably, the major coastal upwellings and some other coastal upwellings have ample surface wave energy (FIG. 7C), which creates favorable conditions for the application of wave-inertia pumps to control coastal upwellings.

Figure 6:
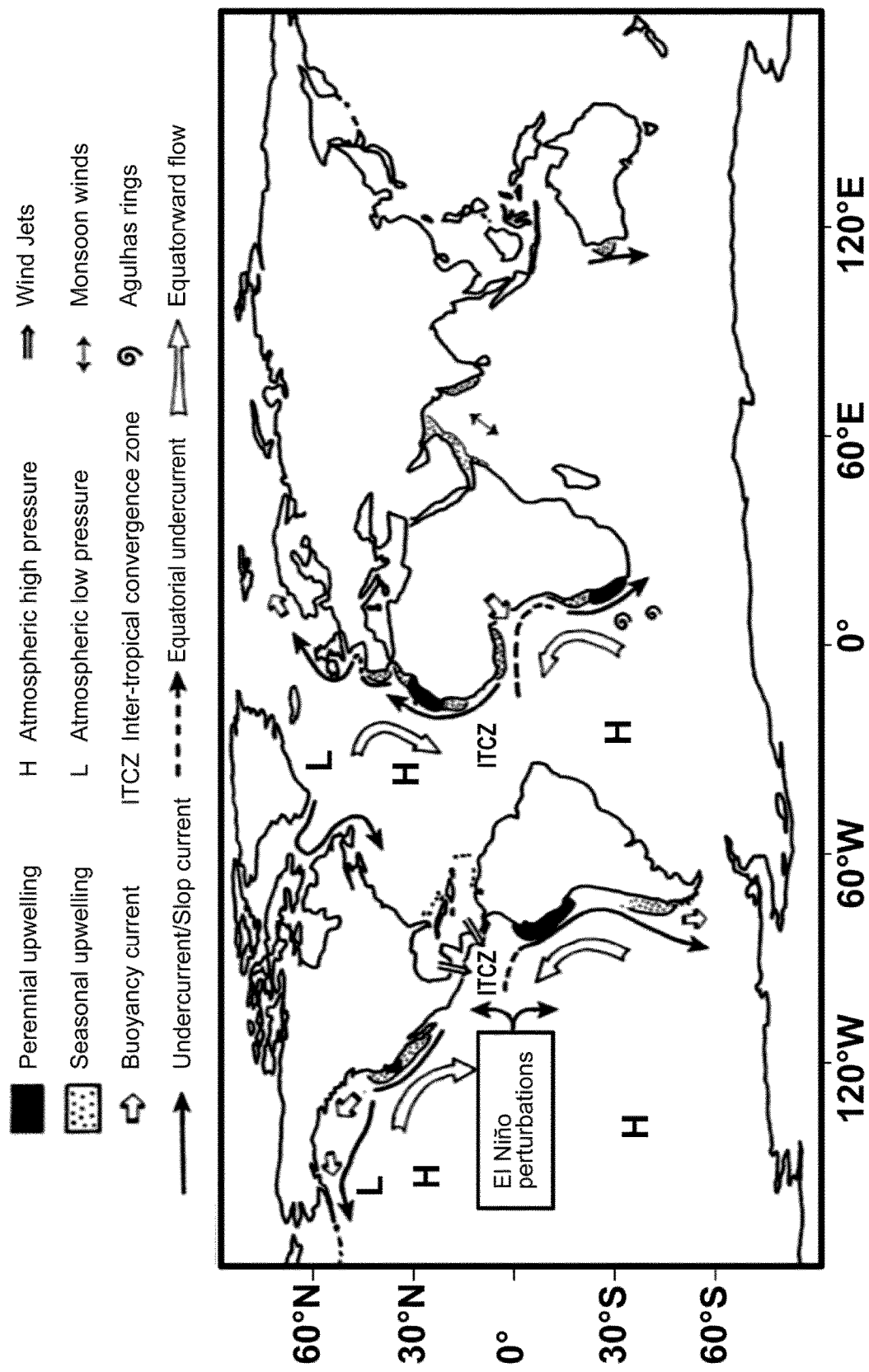
FIG. 6 depicts an exemplary global map showing the ocean eastern boundary currents and major perennial and seasonal upwellings. (After Hill et al. 1998.)
Figure 7A:
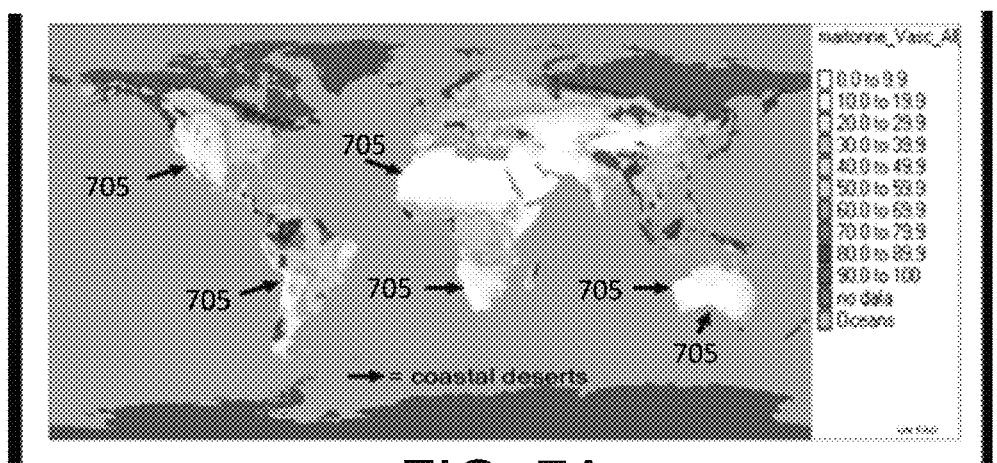
FIG. 7A depicts exemplary coastal arid and semi-arid regions associated with the coastal upwelling.
Figure 7B:
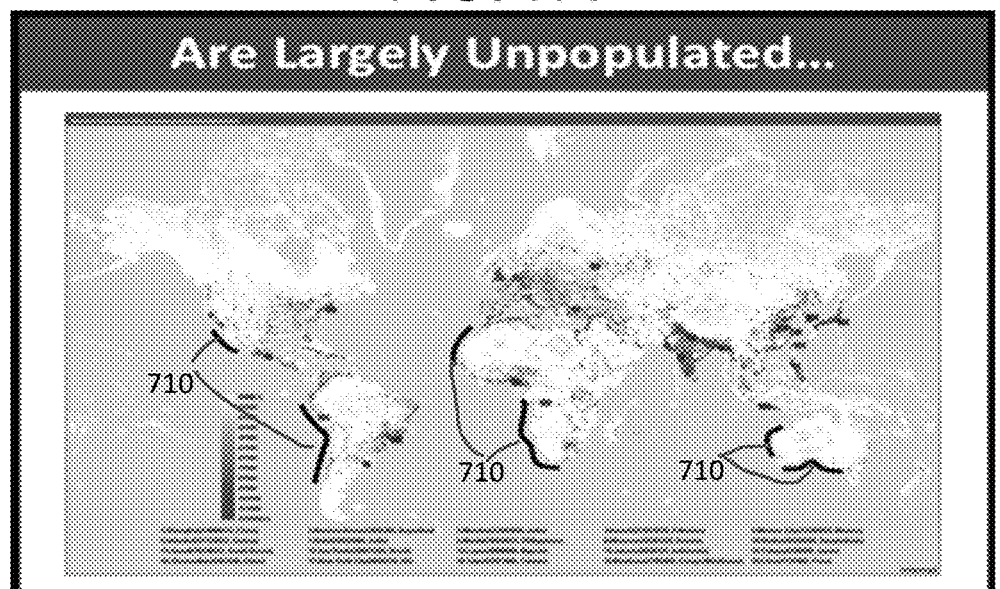
FIG. 7B shows exemplary coastal arid and semi-arid regions largely unpopulated due to desert type climate.
Figure 7C:
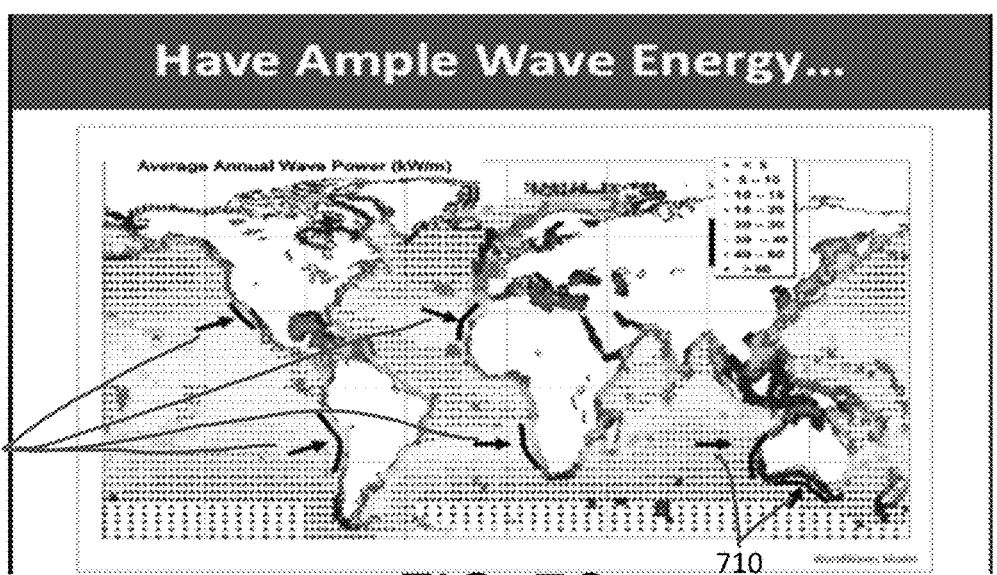
FIG. 7C shows coastal areas typically have ample surface wave energy. (After Atmocean: https://atmocean.wordpress.com/greening-the-deserts/)

Comparing FIG. 6 and FIG. 7A, it follows that coastal upwelling is one of the main factors in the formation of arid and semi-arid coastal climates. The coastal upwelling regions 710 are largely unpopulated due to desert type climates (FIG. 7B). At the same time, these coastal areas typically have ample surface wave energy (FIG. 7C), which is a favorable factor for the implementation of wave-inertial pumps 905, 910 shown in FIG. 9.

In some embodiments, the wave-inertia pump 905 can include a thruster powered by the wave or solar energy with a backup battery to change or maintain its position relative to the coastline, bottom topography, upwelling front, upwelling centres, and filaments.

Figure 4:
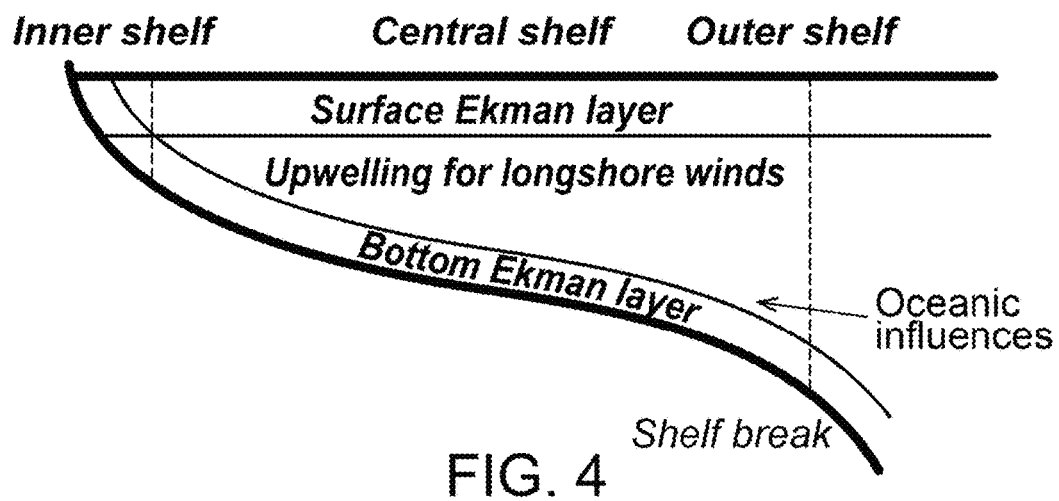
FIG. 4 shows another feature of the coastal upwelling structure (Kaempf and Chapman 2016). Oceanic influences on the outer continental shelf can precondition shelf waters with nutrients-rich water for subsequent wind-driven coastal upwelling events, which incorporate central regions of the shelf. The inner region of the continental shelf is defined by total water depths <50 m. It is a zone where surface and bottom Ekman layers interfere such that the wind-driven water movement is more aligned with the wind direction.

In another embodiment, the ADS 900 can be deployed on the central shelf between the inner shelf and outer shelf (FIG. 4).

In another embodiment, the ADS 900 can be set on the oceanic side of the upwelling front, push the relatively warm and less dense surface water to the colder and denser deep water found in or below the sheared pycnocline to initiate a convective-shear hydrodynamic instability of the Kelvin-Helmholtz type within the sheared pycnocline and upwelling waters and trigger the instability of the upwelling jet.

For example, the upwelling waters affected by the gravitational convection induced by injection of the surface water can initiate the convective-shear hydrodynamic instability of the Kelvin-Helmholtz type within upwelling waters and trigger generation of eddies and filaments reducing the strength of said upwelling. In this disclosure, we utilize this hydrodynamic phenomenon known from other applications in order to disrupt and mix upwelling waters with surrounding warmer waters. The convective-shear hydrodynamic instability caused by the artificial downwelling can result in a larger scale instability including ocean eddies and filaments pushing cold upwelling waters offshore.

Figure 11:
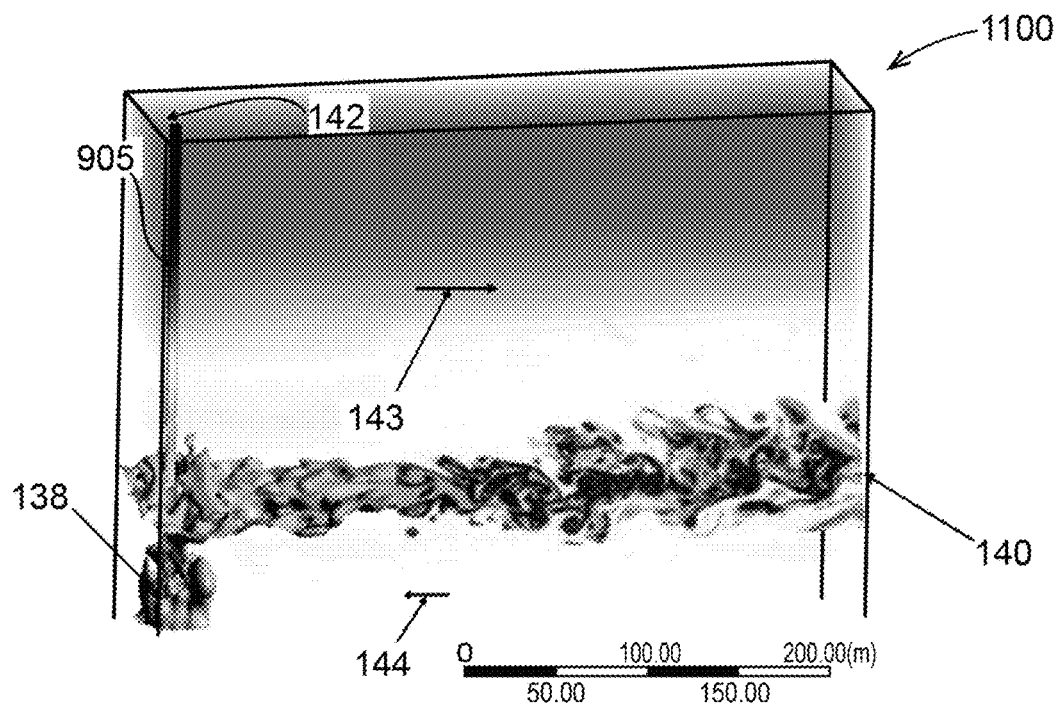
FIG. 11 shows an exemplary development of Kelvin-Helmholtz type instability and large turbulent eddies by the artificial downwelling (computational model with the superimposed images imaging from X. F. Bai. Lecture 7, Turbulence: Ith.se/fileadmin/fm/Education/Courses/Combustion/Lect7_turbu.pdf). Qualitative conjecture is not to scale. The current velocity vectors 143 and 144 schematically show the presence of shear, which in this case is the change of the current velocity with depth. The presence of the current velocity shear in wind-driven coastal upwellings can be understood from the analysis of the coastal ocean circulation in upwelling areas (FIG. 2D and FIG. 3).

As shown in the composite plot 1100 in FIG. 11, the Kelvin-Helmholtz type instability increases the vertical mixing and friction between sheared layers. Energetics of the Kelvin-Helmholtz type instability significantly exceeds the thermal energy being injected into upwelling waters by the artificial upwelling required to trigger this instability. This phenomenon helps reduce the number of wave-inertial pumps required for controlling the coastal upwelling.

Figure 2D:
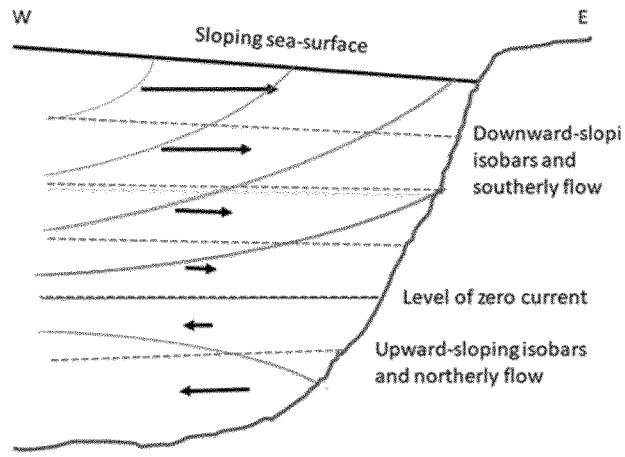
Figure 3:
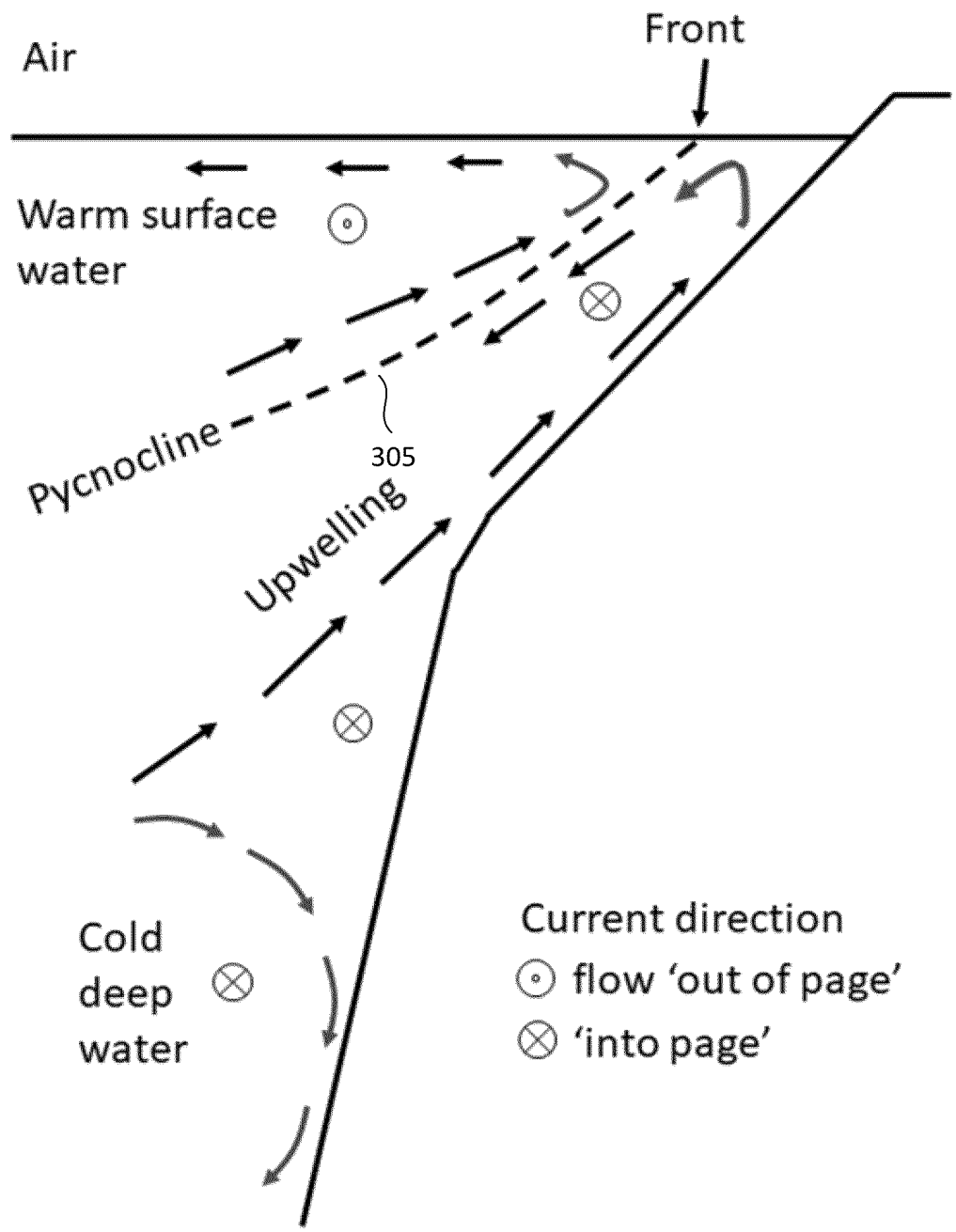
FIG. 3 schematically shows the typical vertical structure of a coastal ocean upwelling (Collins 2001). The diagram shows the uppermost 200 m or so of the water column; the vertical scale here is greatly exaggerated. The wind is equatorward and out of the page. An inclined pycnocline, which is schematically shown in this diagram, separates the warmer near-surface water from the colder upwelling water. The inclined pycnocline is an intrinsic feature of coastal upwellings. A surface feature of the inclined pycnocline is the upwelling front on the sea surface. In a partial upwelling, however, the upwelling pycnocline may not reach the sea surface and, as a result, may not have a surface signature. The diagram includes a poleward-flowing countercurrent, which is found in most upwelling regions in eastern boundary currents. The water masses above and below the pycnocline therefore move in different directions; consequently, there is a velocity shear across the pycnocline. Note that the variety of upwelling regimes over different continental margins can be somewhat different, including the partial upwellings.

The presence of shear is a necessary condition for the development of Kelvin-Helmholtz type instability. The intrinsic shear across the pycnocline associated with coastal upwellings is revealed from the analysis of FIG. 2D and FIG. 3. FIG. 3 shows that the warm surface water and cold deep water move in opposite directions at the pycnocline 305, which results in the vertical shear. The buoyant convection of warm water injected into deeper layers by artificial downwelling can result in the Kelvin-Helmholtz type instability across the sheared layers, which significantly increases turbulent friction and mixing with surrounding water layers. As mentioned above, a similar effect has been observed in different (not related to downwelling) environmental conditions (the diurnal cycle in the upper layer of the ocean) and reproduced with a computational fluid dynamics model by Soloviev and Lukas (2006) and Soloviev and Lukas (2014).

Figure 10A:
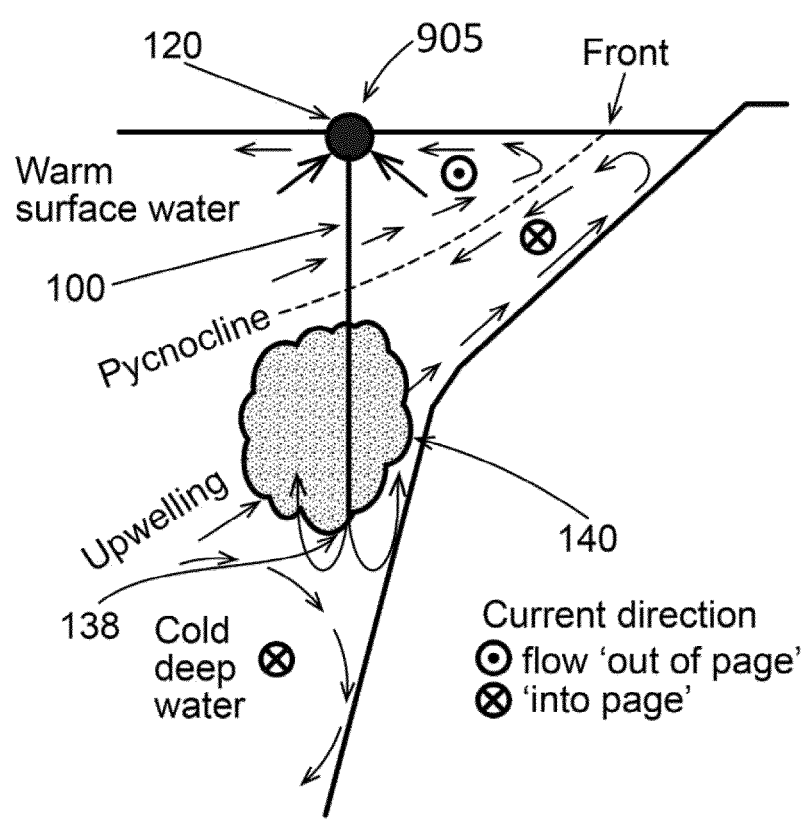
FIG. 10A, FIG. 10B, and FIG. 10C are schematic diagrams showing examples of the wave-inertia pump deployment in the coastal ocean upwelling zone.
Figure 10B:
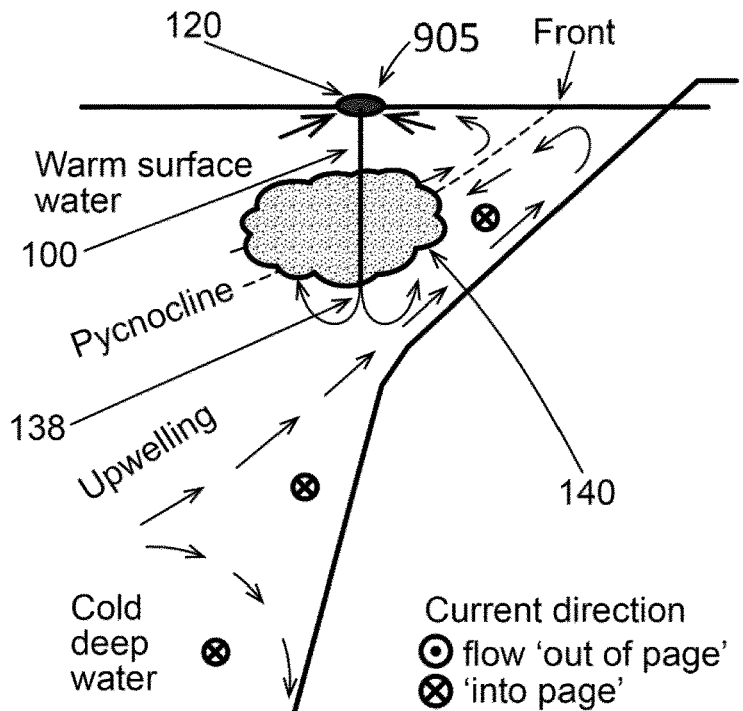
Figure 10C:
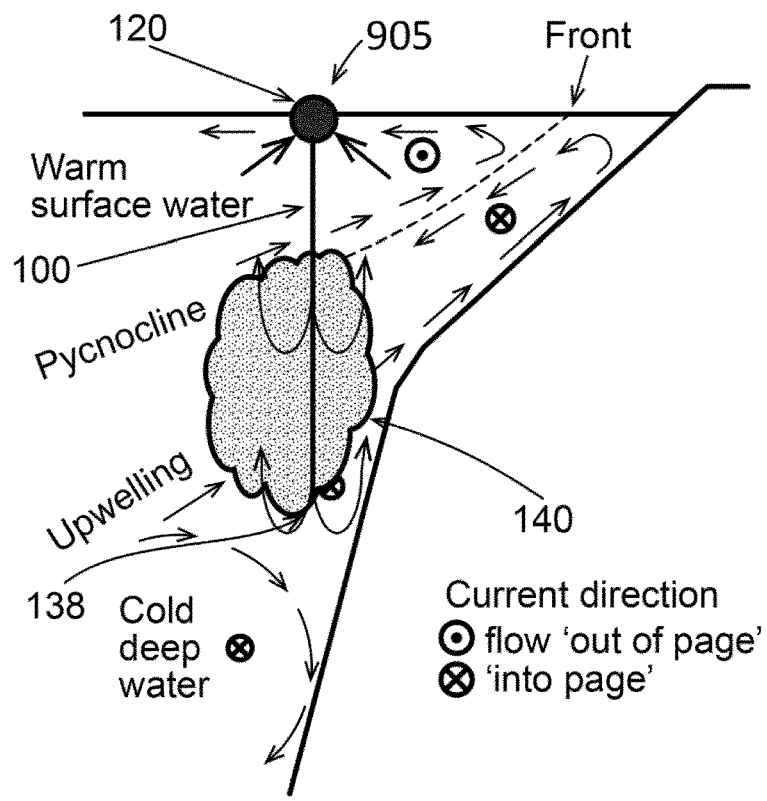

FIGS. 10A-C show three possible configurations (but not limited to) of the wave-inertia pump 905 deployed relative to the position of pycnocline, upwelling, and cold deep-water undercurrent. As shown in FIG. 10A, the main pump outlet 138 is within the depth range of upwelling waters and cold deep-water undercurrent while the side outlets 300 are closed. As shown in FIG. 10B, the main pump outlet 138 is within the depth range of upwelling waters and the sheared pycnocline while the side outlets 300 are closed. As shown in FIG. 10C, the main pump outlet 138 is within the depth range of upwelling waters and the cold deep-water undercurrent while the side outlets 300 are open within the depth range of upwelling waters and the sheared pycnocline. The side outlets 300 may help address the natural variability of the coastal upwelling in depth and position. For example, the a natural variability of location specific characteristics of the coastal ocean upwelling effects may be adapted for.

Figure 12:
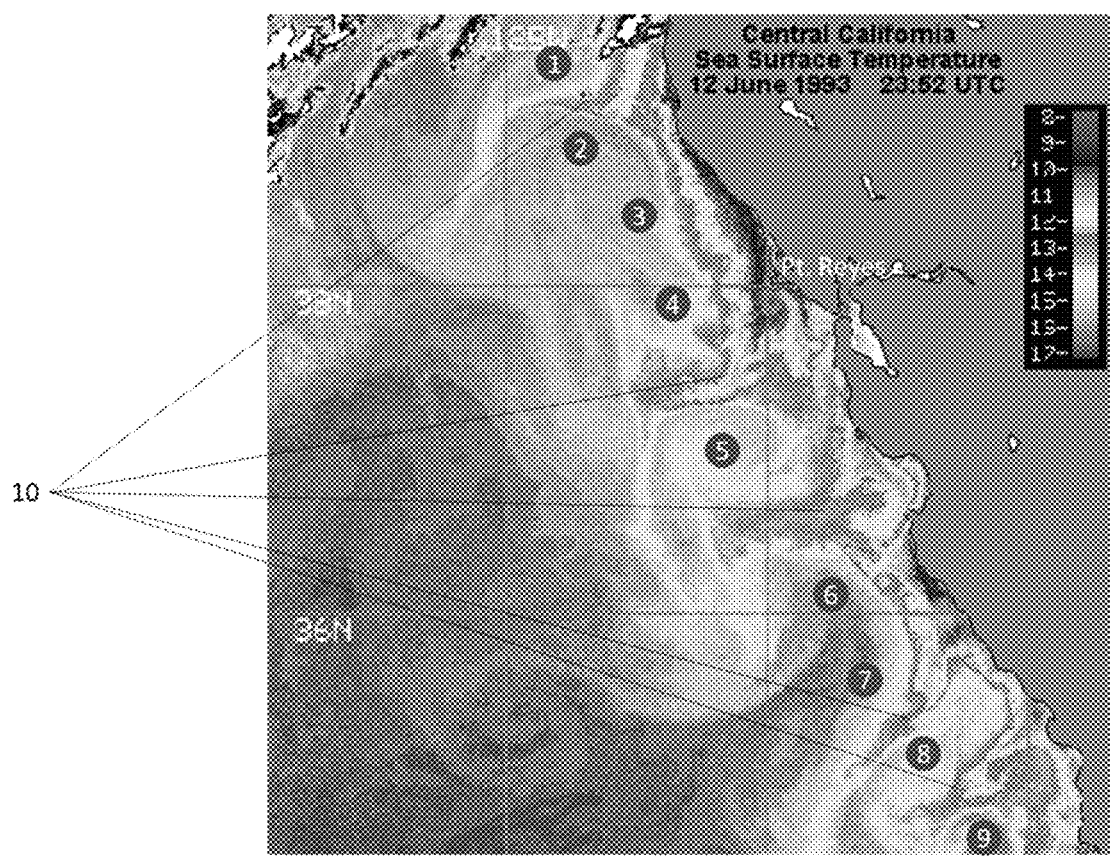
FIG. 12 is a schematic diagram showing exemplary positions of wave-inertia pump clusters. A cluster may include a single or plurality of wave-inertia pumps. The position of the hypothetical wave inertia pump clusters is superimposed here on a 5-year (July 1998-June 2003) composite of SST, derived from the daily high-resolution NOAA AVHRR and SeaWiFS ocean color data.

In one embodiment, being moored on the oceanic side of the upwelling front, as shown in FIG. 12, wave-inertia pumps 10 may push the surface water to deeper cold layers. After leaving the main pump outlet 138 or/and the side outlets 300, the surface warm and less dense water undergoes buoyant convection in the upward direction, which triggers a convective-shear hydrodynamic instability of the Kelvin-Helmholtz type and the instability of the upwelling jet leading to disruption of the upwelling.

In the case of a partial upwelling, for which the front may not have any surface features, identifying the front location may require standard oceanographic observations like a CTD cross-shelf transect or an acoustic sounding (e.g., by a ship, AUV, glider, etc.) before deploying the artificial downwelling system.

The wave-inertia pump 905 deployed on the oceanic side of the upwelling front can affect the coastal upwelling by the following three processes:
1. Supplying the thermal energy directly into upwelling waters, thus increasing the temperature of the upwelled water;
2. Entraining the water from above the pycnocline, thus additionally increasing the temperature of the upwelled water; and
3. Triggering the convective-shear instability of Kelvin-Helmholtz type and consecutive instability of the upwelling jet that disrupts the coastal upwelling locally at the location of the artificial downwelling system and non-locally on the scale of coastal ocean eddies and filaments.

These three processes will help control said coastal upwelling with the artificial downwelling.

Figure 2A:
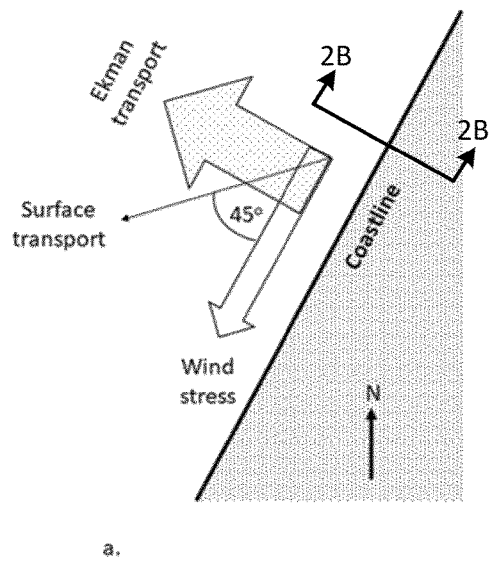
FIG. 2A, FIG. 2B, FIG. 2C, and FIG. 2D are diagrams (not to scale) from Collins (2001) to illustrate the theoretical essentials of a coastal upwelling (here shown for the Northern Hemisphere) in more detail.
Figure 2B:
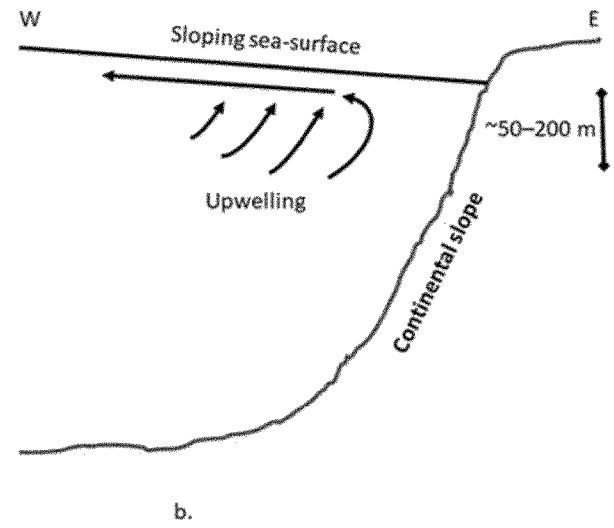
Figure 2C:
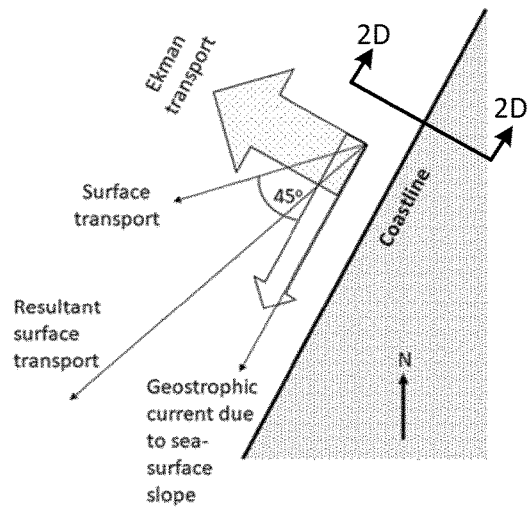

Additionally, the geostrophic current schematically shown in FIG. 2C and tides (not shown, but almost always present) can extend the mixing zone 140 shown in FIGS. 10A-C downstream and upstream thus enlarging the area of the upwelling disruption. As a result, a smaller number of wave-inertia pumps will be required to mitigate adverse upwelling effects over larger coastal areas.

In another exemplary embodiment, the wave-inertia pumps 10 are to be installed near the upwelling centres 1-9 (FIG. 12).

In the exemplary embodiment schematically shown in FIG. 12, the wave-inertia pumps 10 can be set near upwelling centres 1-9, on the oceanic side of the upwelling front and outside of the upwelling filaments. The position of nine clusters of wave-inertia pumps 10 is superimposed in this figure on a 5-year composite of sea surface temperature, derived from the daily high-resolution NOAA AVHRR and SeaWiFS ocean color data satellites.

Figure 5:
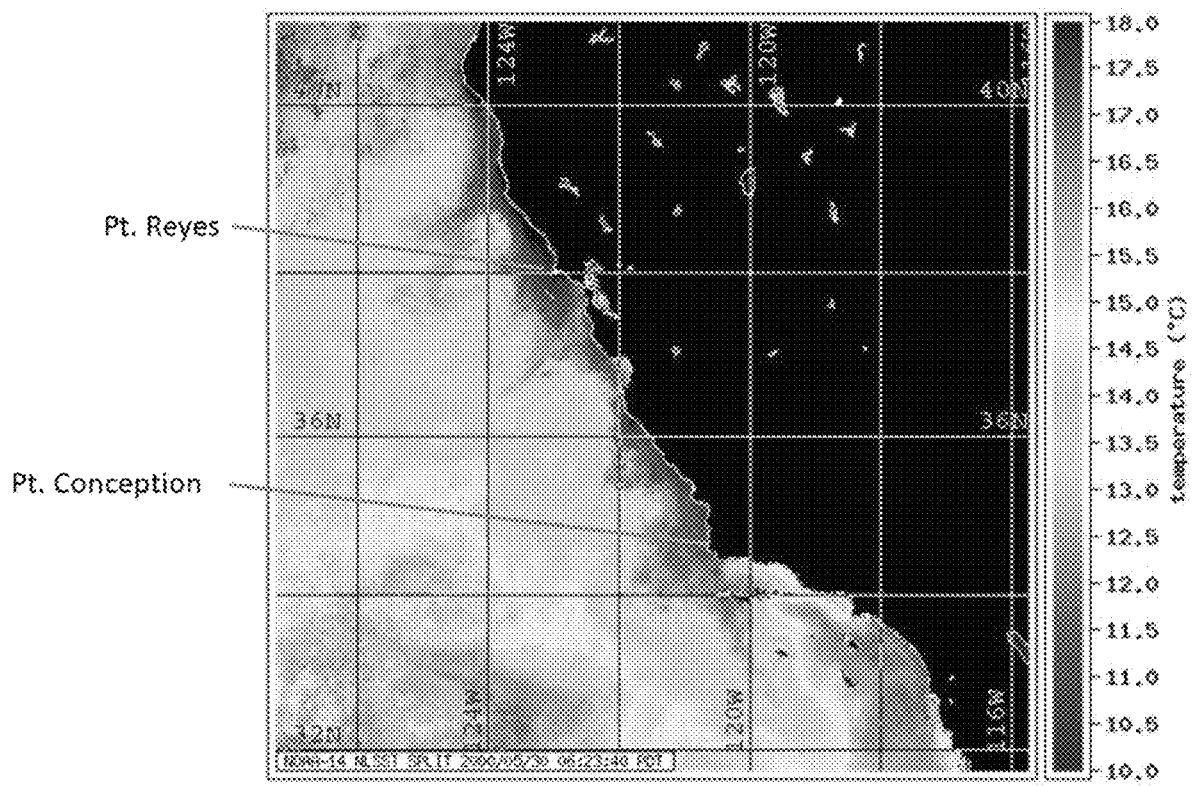
FIG. 5 is a satellite image of the temperature of the ocean surface from the spring of 2000 illustrating the spatial pattern of the coastal upwelling on West Coast of the United States. Water temperatures are typically colder adjacent to shore than further offshore for most of the California coastline north of Point Conception—the bend in the coastline at 34.5 N. Notice that the strength of the upwelling, as evidenced by how far the cold water extends offshore, varies substantially along the coastline. Pronounced upwelling filaments, where upwelled water is pushed hundreds of miles offshore, are associated with several prominent points along the coastline—upwelling centres. Image courtesy of Sanctuary Quest 2002, NOAA/OER. https://oceanexplorer.noaa.gov/explorations/02quest/background/upwelling/media/Fig2_map.html

A few wave-inertia pump clusters can control, for example, the prominent upwelling centre around Pt. Reyes, California (FIG. 5).

The disruption of the coastal ocean upwelling with an artificial downwelling will increase the sea surface temperature and evaporation from the sea surface in the coastal area, consequently increasing air humidity and precipitation, promoting green infrastructure, and reducing the incidence of forest fires.

Furthermore, harmful algal blooms can develop in the coastal upwelling areas due to high concentrations of nutrients in the upwelling water (Kaempf and Chapman 2016). Control of the upwelling intensity may therefore help to regulate harmful algal blooms.

Manufacturing, deployment, and maintenance of wave-inertia pump clusters in upwelling areas include the ship time and navigation considerations. Preliminary estimates nevertheless suggest that the total costs will be only a small percentage of the loss caused by adverse effects of costal upwellings.

As a new element, the wave-inertia pump 905 may have one or more side outlets 300 (FIGS. 9 and 10C), or more similar side outlets, to adjust to the specific upwelling structure. The cross-section area of the side outlets 300 can be mechanically adjusted before the deployment at sea. A pressure reducing or limiting valve (e.g., PRoPLV 301) to regulate the discharge rate of the artificial upwelling may, for example, be adjusted before the deployment at sea as well.

In another exemplary embodiment, the cross-section area of any of the side outlets 300 and the PRoPLVs 301 can be controlled electromechanically through a remote telecommand tool during the artificial downwelling system operation at sea. The coastal upwelling can then be regulated by the artificial downwelling system based on the available in-situ oceanographic and atmospheric data and remote sensing measurements. Since the action of artificial downwelling on local weather takes some time to develop for certain applications, including mitigating wildfire risks, accurately predicting fire weather conditions such as strong winds, low humidity, dry fuels, and time of day are of critical importance for optimizing the operational schedule of the artificial upwelling. Typical strong wildfire events, such as during Santa Ana winds in California, include a dramatic crash of relative humidity to single digits and wind gusts up to 50-70 mph. The forecasts based on atmospheric pressure differences between specific observation sites used to estimate the risk of wildfires in California, for example the pressure difference LAX-DAG for Santa Ana, SBA-SMX for Sundowner Winds, can be implemented as a guidance for remotely controlled artificial downwelling systems. A 10 mbar or larger offshore difference in the atmospheric pressure predicts a significant wind event and higher risks of wildfires (Phillips 2021). The increase of the sea surface temperature in coastal waters due to the upwelling disruption can result in an increase of the partial pressure of vapor by several mbar, which can reduce the offshore pressure difference to non-critical values and thus reduce the risk of wildfires.

If a wildfire has already started, fire properties can be measured and monitored in real-time by remote sensing technologies. GOES-R Satellite Series Advanced Baseline Imager (ABI) can detect heat signatures of wildfires with high time and space resolution. GEOS ABI and live interactive web cameras (where available) provide early wildfire detection almost instantaneously (Schmidt and Strenfel 2021). A wildfire computer model, assimilating environmental conditions (e.g., WiFire), can then predict severity and the spreading patterns, distilling the numerous fires that occur and identify (through detection technologies) which fires pose the most risk and deserve priority in analysis (Tardy 2021). Computational models combined with artificial intelligence (machine learning) may also be helpful to predict wildfires and optimize the schedule of the artificial downwelling system operation.

The geographic locations where the disclosure can be deployed include, but not limited to, for example, the Central California coast of the North Pacific Ocean (FIG. 12). The disclosure applies to the coastal upwelling areas where the coastal ocean experiences wave action due to wind and/or swell waves (see FIG. 7C). The suitable upwelling areas where the disclosure can be deployed are coastal areas of the major eastern boundary currents such as the Canary Current (off Northwest Africa), the Benguela Current (off southern Africa), the California Current (off California and Oregon), the Humboldt Current (off Peru and Chile), and the Somalia Current (off Somalia and Oman) (FIG. 6) and the coastal upwelling areas in Indonesia, Australia, New Zealand and elsewhere.

Figure 8:
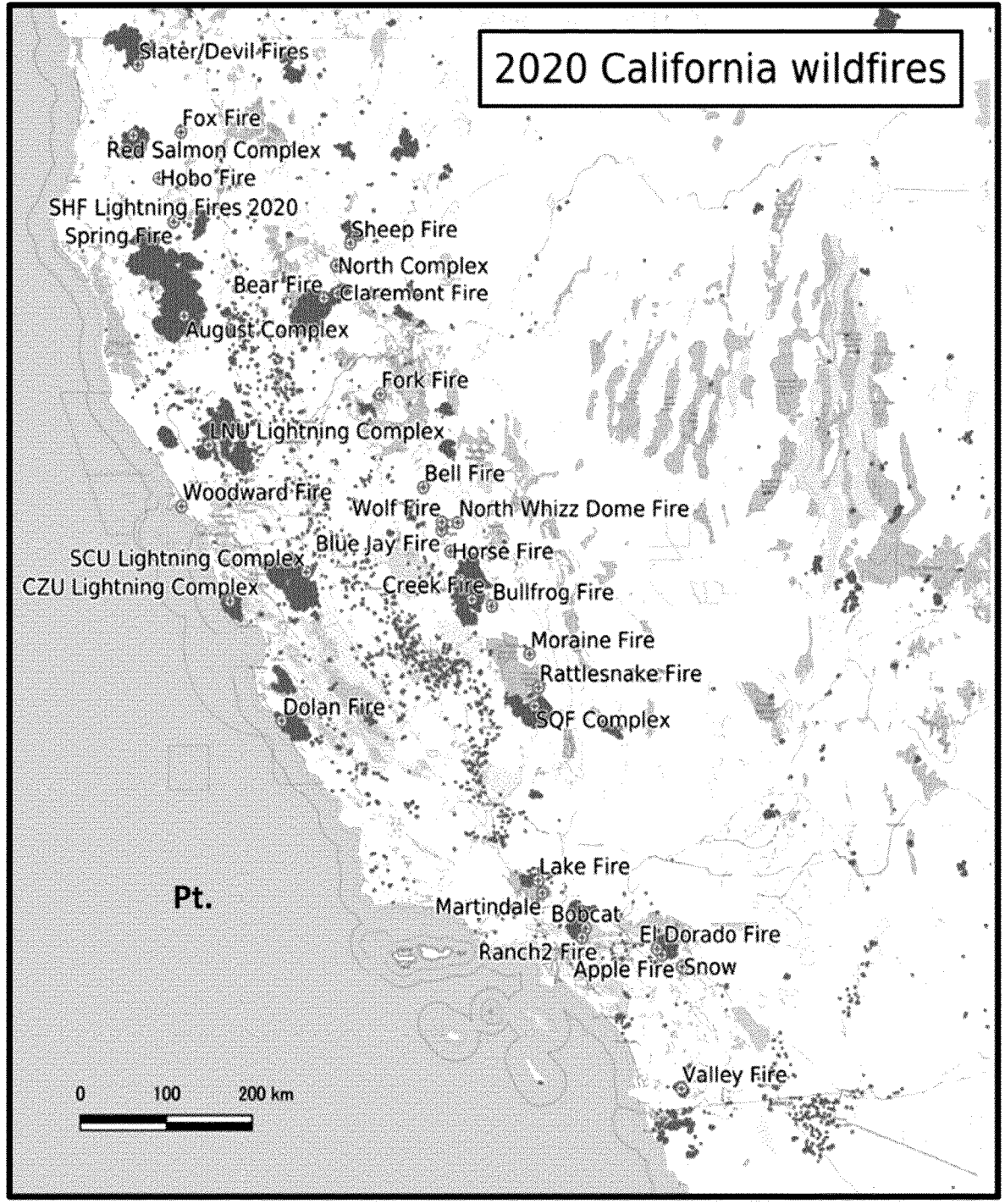
FIG. 8. Map of 2020 California wildfires. https:en.wikipedia.org/wiki/2020_California_wildfires#/media/File:2020_California_wildfires.png

The disclosure can advantageously be utilized during the years and months when the upwelling intensity is the highest and the air is the driest and most susceptible to forest fires (FIG. 8). These conditions can form due to the local events like Santa Ana winds, seasonal cycle of coastal upwellings, or multi-year climate oscillations such as El Nino-Southern Oscillation cycle or longer period cycles.

FIG. 5 demonstrates that the abrupt change in coastline orientation at Pt. Conception creates a sharp transition between upwelling regions to the north of the Pt. Conception and warmer waters of the Santa Barbara Channel. Remarkably, there is a corresponding reduction of forest fire incidents in the coastal areas south of Pt. Conception (see FIG. 8). This emphasizes a connection between coastal upwellings and the incidents of forest fire in the related coastal areas.

By reducing or temporarily eliminating the coastal upwelling by the artificial downwelling, the disclosure provides a method for promoting green infrastructure and agriculture, reducing the incidence of forest fires in the related arid and semi-arid coastal regions, and mitigating harmful algal blooms. While the central California coast is one example of an advantageous region for the implementation of disclosure (for example, as shown in FIG. 12), the disclosure can likewise be applied to mitigate or moderate climatic extremes related to the coastal ocean upwelling in other geographic locations of the world, particularly in the major upwelling areas depicted in FIG. 6.

In a summary of this section, the disclosure describes a method and means for mitigating adverse coastal ocean upwelling effects by creating an artificial downwelling supplying the surface water to deeper layers and disrupting said upwelling. The artificial downwelling can be produced with a free-floating, self-propelled, or anchored wave-inertia pump or plurality of said wave-inertia pumps, with the adjusted tube lengths including one or several outlets at different depths based on the oceanographic survey of the upwelling area. The productivity of the wave-inertia pump can be regulated by pressure reducing or limiting valves and changing outlet's cross section. The wave-inertia pumps deployed on the oceanic (warmer) side of the upwelling front will pump the warm surface water in or below the sheared pycnocline. The warmer surface water undergoing buoyant convection in the colder deeper water will trigger a convective-shear hydrodynamic instability in the layer of upwelling waters leading to the instability of the upwelling jet and disruption of said coastal upwelling, which will increase the sea surface temperature in the coastal area. The increased sea surface temperature will intensify evaporation and air humidification. The increase of the sea surface temperature of coastal waters due to the upwelling disruption will increase the air partial vapor pressure, which then can reduce the offshore atmosphere pressure difference, reduce occasions of significant wind events, and finally reduce the risk of wildfires in adjacent coastal areas. Additionally, the air humidification will result in more frequent coastal rains, which will further reduce incidences of forest fires. By reducing or temporarily eliminating the coastal upwelling by the artificial downwelling, the disclosure provides a method for promoting green infrastructure while reducing the incidence of wildfires in arid and semi-arid coastal regions. Mitigating harmful algal blooms in the coastal upwelling is another application of one or more embodiments disclosed herein. For preserving fishery while still mitigating arid and semi-arid climates in coastal areas the productivity of the artificial downwelling system can advantageously be controlled through remote telemetry.

The art that the present disclosure is not limited to what has been particularly shown and described herein above. In addition, unless mention was made above to the contrary, it should be noted that all the accompanying drawings are not to scale. There are many different features to the present disclosure, and it is completed that these features may be used together or separately. Thus, the disclosure should not apply to any particular combination of features or to a particular application of the disclosure might occur to those skilled in the art to which the disclosure pertains. Accordingly, all expedient modifications readily attainable by one versed in the art from the disclosure set forth herein that are within the scope and spirit of the present disclosure are to be included as further embodiments of the present disclosure.

Figure 13:
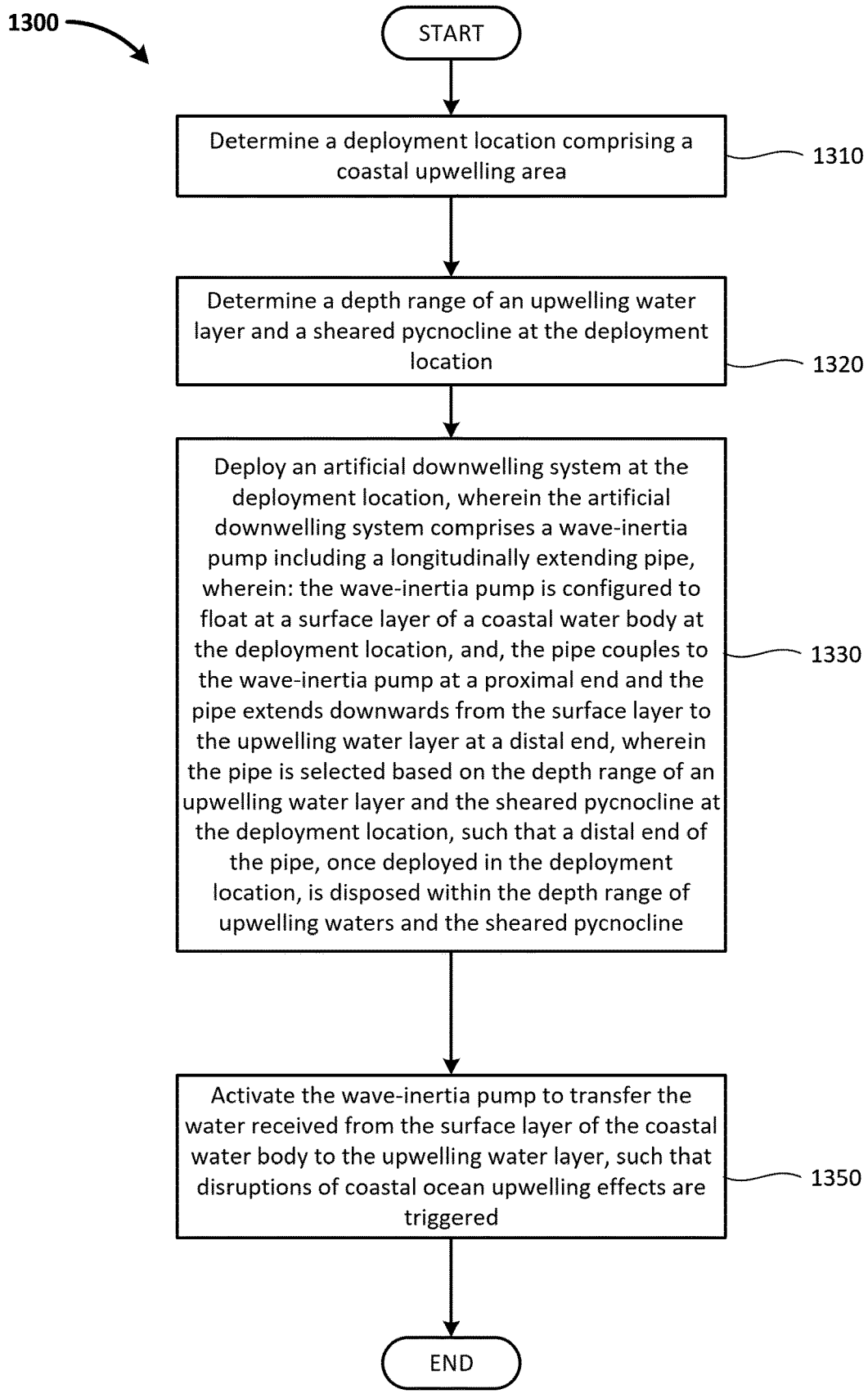
FIG. 13 is a flow diagram showing an exemplary artificial downwelling method.

FIG. 13 is a flow diagram showing an exemplary artificial downwelling method 1300. For example, an engineer may use the method 1300 to deploy the ADS 900. At step 1310, a deployment location including a coastal upwelling area is determined. At step 1320, a depth range of an upwelling water layer and a sheared pycnocline at the deployment location is determined.

At step 1330, an artificial downwelling system (e.g., the ADS 900) is deployed at the deployment location. For example, the artificial downwelling system may include a wave-inertia pump (e.g., the wave-inertia pump 905) including a longitudinally extending pipe (e.g., the pipe 110). For example, the wave-inertia pump may be configured to float at a surface layer of a coastal water body at the deployment location. For example, the pipe may be coupled to the wave-inertia pump at a proximal end and the pipe extends downwards from the surface layer to the upwelling water layer at a distal end. For example, the pipe may be selected based on the depth range of an upwelling water layer and the sheared pycnocline at the deployment location. For example, a distal end of the pipe, once deployed in the deployment location, may be disposed within the depth range of upwelling waters and the sheared pycnocline.

At step 1350, the wave-inertia pump is activated to transfer the water received from the surface layer of the coastal water body to the upwelling water layer. For example, disruptions of coastal ocean upwelling effects may be triggered.

Although various embodiments have been described with reference to the figures, other embodiments are possible.

Although an exemplary system has been described with reference to FIG. 9, other implementations may be deployed in other industrial, scientific, medical, commercial, and/or residential applications.

In various embodiments, some bypass circuits implementations may be controlled in response to signals from analog or digital components, which may be discrete, integrated, or a combination of each. Some embodiments may include programmed, programmable devices, or some combination thereof (e.g., PLAs, PLDs, ASICs, microcontroller, microprocessor), and may include one or more data stores (e.g., cell, register, block, page) that provide single or multi-level digital data storage capability, and which may be volatile, non-volatile, or some combination thereof. Some control functions may be implemented in hardware, software, firmware, or a combination of any of them.

Computer program products may contain a set of instructions that, when executed by a processor device, cause the processor to perform prescribed functions. These functions may be performed in conjunction with controlled devices in operable communication with the processor. Computer program products, which may include software, may be stored in a data store tangibly embedded on a storage medium, such as an electronic, magnetic, or rotating storage device, and may be fixed or removable (e.g., hard disk, floppy disk, thumb drive, CD, DVD).

Although an example of a system, which may be portable, has been described with reference to the above figures, other implementations may be deployed in other processing applications, such as desktop and networked environments.

Temporary auxiliary energy inputs may be received, for example, from chargeable or single use batteries, which may enable use in portable or remote applications. Some embodiments may operate with other DC voltage sources, such as batteries, for example. Alternating current (AC) inputs, which may be provided, for example from a 50/60 Hz power port, or from a portable electric generator, may be received via a rectifier and appropriate scaling. Provision for AC (e.g., sine wave, square wave, triangular wave) inputs may include a line frequency transformer to provide voltage step-up, voltage step-down, and/or isolation.

Although particular features of an architecture have been described, other features may be incorporated to improve performance. For example, caching (e.g., L1, L2, . . . ) techniques may be used. Random access memory may be included, for example, to provide scratch pad memory and or to load executable code or parameter information stored for use during runtime operations. Other hardware and software may be provided to perform operations, such as network or other communications using one or more protocols, wireless (e.g., infrared) communications, stored operational energy and power supplies (e.g., batteries), switching and/or linear power supply circuits, software maintenance (e.g., self-test, upgrades), and the like. One or more communication interfaces may be provided in support of data storage and related operations.

Some systems may be implemented as a computer system that can be used with various implementations. For example, various implementations may include digital circuitry, analog circuitry, computer hardware, firmware, software, or combinations thereof. Apparatus can be implemented in a computer program product tangibly embodied in an information carrier, e.g., in a machine-readable storage device, for execution by a programmable processor; and methods can be performed by a programmable processor executing a program of instructions to perform functions of various embodiments by operating on input data and generating an output. Various embodiments can be implemented advantageously in one or more computer programs that are executable on a programmable system including at least one programmable processor coupled to receive data and instructions from, and to transmit data and instructions to, a data storage system, at least one input device, and/or at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, which may include a single processor or one of multiple processors of any kind of computer. Generally, a processor will receive instructions and data from a read-only memory or a random-access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including, by way of example, semiconductor memory devices, such as EPROM, EEPROM, and flash memory devices; magnetic disks, such as internal hard disks and removable disks; magneto-optical disks; and CD-ROM and DVD-ROM disks. The processor and the memory can be supplemented by, or incorporated in, ASICs (application-specific integrated circuits).

In some implementations, each system may be programmed with the same or similar information and/or initialized with substantially identical information stored in volatile and/or non-volatile memory. For example, one data interface may be configured to perform auto configuration, auto download, and/or auto update functions when coupled to an appropriate host device, such as a desktop computer or a server.

In some implementations, one or more user-interface features may be custom configured to perform specific functions. Various embodiments may be implemented in a computer system that includes a graphical user interface and/or an Internet browser. To provide for interaction with a user, some implementations may be implemented on a computer having a display device. The display device may, for example, include an LED (light-emitting diode) display. In some implementations, a display device may, for example, include a CRT (cathode ray tube). In some implementations, a display device may include, for example, an LCD (liquid crystal display). A display device (e.g., monitor) may, for example, be used for displaying information to the user. Some implementations may, for example, include a keyboard and/or pointing device (e.g., mouse, trackpad, trackball, joystick), such as by which the user can provide input to the computer.

In various implementations, the system may communicate using suitable communication methods, equipment, and techniques. For example, the system may communicate with compatible devices (e.g., devices capable of transferring data to and/or from the system) using point-to-point communication in which a message is transported directly from the source to the receiver over a dedicated physical link (e.g., fiber optic link, point-to-point wiring, daisy-chain). The components of the system may exchange information by any form or medium of analog or digital data communication, including packet-based messages on a communication network. Examples of communication networks include, e.g., a LAN (local area network), a WAN (wide area network), MAN (metropolitan area network), wireless and/or optical networks, the computers and networks forming the Internet, or some combination thereof. Other implementations may transport messages by broadcasting to all or substantially all devices that are coupled together by a communication network, for example, by using omni-directional radio frequency (RF) signals. Still other implementations may transport messages characterized by high directivity, such as RF signals transmitted using directional (i.e., narrow beam) antennas or infrared signals that may optionally be used with focusing optics. Still other implementations are possible using appropriate interfaces and protocols such as, by way of example and not intended to be limiting, USB 2.0, Firewire, ATA/IDE, RS-232, RS-422, RS-485, 802.11 a/b/g, Wi-Fi, Ethernet, IrDA, FDDI (fiber distributed data interface), token-ring networks, multiplexing techniques based on frequency, time, or code division, or some combination thereof. Some implementations may optionally incorporate features such as error checking and correction (ECC) for data integrity, or security measures, such as encryption (e.g., WEP) and password protection.

In various embodiments, the computer system may include Internet of Things (IoT) devices. IoT devices may include objects embedded with electronics, software, sensors, actuators, and network connectivity which enable these objects to collect and exchange data. IoT devices may be in-use with wired or wireless devices by sending data through an interface to another device. IoT devices may collect useful data and then autonomously flow the data between other devices.

Various examples of modules may be implemented using circuitry, including various electronic hardware. By way of example and not limitation, the hardware may include transistors, resistors, capacitors, switches, integrated circuits, other modules, or some combination thereof. In various examples, the modules may include analog logic, digital logic, discrete components, traces and/or memory circuits fabricated on a silicon substrate including various integrated circuits (e.g., FPGAs, ASICs), or some combination thereof. In some embodiments, the module(s) may involve execution of preprogrammed instructions, software executed by a processor, or some combination thereof. For example, various modules may involve both hardware and software.

In an illustrative aspect, an artificial downwelling system may be configured to mitigate adverse coastal ocean upwelling effects. The artificial downwelling system may include a wave-inertia pump configured to float on a surface layer of a coastal water body. The wave-inertia pump may include: a pressure limiting valve configured to receive water from the surface layer of the coastal water body; a longitudinally extending pipe at a proximal end coupled to the pressure limiting valve, wherein; and, a main outlet coupled to a distal end of the longitudinally extending pipe, the main outlet is configured to discharge water received from the pressure limiting valve through the longitudinally extending pipe, wherein, when the wave-inertia pumps are deployed at the coastal water body, the longitudinally extending pipe includes a length configured to extend downwards from the surface layer to an upwelling water layer of the coastal water body, such that the water received from the surface layer is flowingly injected to the upwelling water layer through the longitudinally extending pipe and the main outlet, such that disruptions of coastal ocean upwelling effects are triggered.

The longitudinally extending pipe may include a side outlet disposed along a longitudinal axis of the longitudinally extending pipe, wherein a location of the side outlet is determined based on a depth range of the upwelling water layer of the coastal water body, such that a natural variability of location specific characteristics of the coastal ocean upwelling effects is adapted for. The longitudinally extending pipe may include more than one of the side outlets at different depths in or below a pycnocline and upwelling waters.

The artificial downwelling system may be deployed on an oceanic side of the coastal water body including an upwelling front, wherein the water from the surface layer is warmer and less dense than the water in the upwelling water layer, such that the coastal ocean upwelling effects is disrupted by convective-shear hydrodynamic instability and shedding mesoscale eddies.

The artificial downwelling system may include multiple of the wave-inertia pumps deployed in at least one cluster to cooperatively inject water into the upwelling water layer. Each of the wave-inertia pumps may further include a controller configured to receive control signals to control the pressure limiting valve, wherein the pressure limiting valve is electromechnically controlled, such that an output productivity of a corresponding one of the plurality of wave-inertia pumps includes a downward waterflow speed regulated through the control signals. The controller may be powered by at least one of electrical batteries, wave energy, wind energy, and/or solar panel energy backed by electrical batteries. The control signals may be generated based on environmental oceanographic and atmospheric conditions and/or remote sensing data. The control signals may be generated based on a machine learning model.

In an illustrative aspect, a method for using an artificial downwelling system to mitigate adverse coastal ocean upwelling effects may include: determine a deployment location including a coastal upwelling area; determine a depth range of an upwelling water layer and a sheared pycnocline at the deployment location; and/or deploy an artificial downwelling system at the deployment location. The artificial downwelling system may include a wave-inertia pump including a pipe extending along a longitudinal axis. The wave-inertia pump may be configured to float at a surface layer of a coastal water body at the deployment location. The pipe may be coupled to a buoyant module at a proximal end and extends downward from the surface layer to an upwelling water layer of the coastal water body at a distal end. The pipe may be selected based on the depth range of the upwelling water layer and the sheared pycnocline at the deployment location, such that the distal end of the pipe, once deployed in the deployment location, is disposed within the depth range of upwelling water layer and the sheared pycnocline. The method may include activate the wave-inertia pump to transfer the water received from the surface layer of the coastal water body to the upwelling water layer, such that disruptions of coastal ocean upwelling effects are triggered.

The method may include determine a natural variability of depth and position of a coastal ocean upwelling effects at the deployment location; and, dispose, if required, at least one side outlet along a longitudinal axis of the pipe, wherein each location of the at least one side outlet is determined based on the natural variability, such that the at least one side outlet is disposed at different depths in or below a pycnocline and upwelling waters.

Determine the deployment location may include determine a central shelf between an inner shelf and an outer shelf of the coastal upwelling area.

The method may include receive a control signal from a remote telemetry tool, wherein a productivity of the wave-inertia pump including a downward waterflow speed is electromechanically controlled through the control signal.

The method may include preset an output productivity of the wave-inertia pump including a downward waterflow speed, wherein the artificial downwelling system may be activated continuously in time, such that water at the surface layer is continuously released at the upwelling water layer.

Determine the deployment location may include a central shelf between an inner shelf and an outer shelf of the coastal water body.

The method may include deploy multiple artificial downwelling systems at the deployment locations geographically concentrating near at least one upwelling center along a wildfire coastline.

The wave-inertia pump may be activated continuously in time, such that the water received from the surface layer is continuously released at the upwelling water layer.

The method may include determine a current climate at the deployment location, and, activate the artificial downwelling system only during arid and semi-arid periods of coastal climate at the deployment location.

An output productivity of the wave-inertia pump may include a downward waterflow speed predetermined before deployment.

Determine the deployment location may include determine an oceanic side of the coastal water body including an upwelling front, wherein the water from the surface layer is warmer and less dense than water in the upwelling water layer, such that the coastal ocean upwelling effects is disrupted by convective-shear hydrodynamic instability and shedding mesoscale eddies.

The method may include receive a control signal using a wireless communication module, such that activate or control the wave-inertia pump productivity to transfer the water received from the surface layer to the upwelling water layer is performed only when the control signal is received.

The artificial downwelling system may include multiple of the wave-inertia pumps, deployed in at least one cluster to cooperatively inject water into the upwelling water layer.

A number of implementations have been described. Nevertheless, it will be understood that various modifications may be made. For example, advantageous results may be achieved if the steps of the disclosed techniques were performed in a different sequence, or if components of the disclosed systems were combined in a different manner, or if the components were supplemented with other components. Accordingly, other implementations are contemplated within the scope of the following claims.

What is claimed is:

1. A method for using an artificial downwelling system to mitigate adverse coastal ocean upwelling effects, the method comprising:
   determining a deployment location comprising a coastal upwelling area;
   determining a depth range of an upwelling water layer and a sheared pycnocline at the deployment location;
   deploying an artificial downwelling system at the deployment location, wherein the artificial downwelling system comprises a wave-inertia pump comprising a pipe extending along a longitudinal axis, wherein:
      the wave-inertia pump is configured to float at a surface layer of a coastal water body at the deployment location, and,
      the pipe is coupled to a buoyant module at a proximal end and extends downwards from the surface layer to an upwelling water layer of the coastal water body at a distal end, wherein the pipe is selected based on the depth range of the upwelling water layer and the sheared pycnocline at the deployment location, such that the distal end of the pipe, once deployed in the deployment location, is disposed within the depth range of upwelling water layer and the sheared pycnocline; and,
   activating the wave-inertia pump to transfer the water received from the surface layer of the coastal water body to the upwelling water layer, such that disruptions of coastal ocean upwelling effects are triggered.

2. The method of claim 1, further comprises:
   determining a natural variability of depth and position of a plurality of coastal ocean upwelling effects at the deployment location; and,
   disposing, as a function of the determined natural variability, at least one side outlet along the longitudinal axis of the pipe, wherein each location of the at least one side outlet is determined based on the natural variability, such that the at least one side outlet is disposed at different depths in or below a pycnocline and upwelling waters.

3. The method of claim 1, wherein determining the deployment location comprises determine a central shelf between an inner shelf and an outer shelf of the coastal upwelling area.

4. The method of claim 1, further comprises receiving a control signal from a remote telemetry tool, wherein a productivity of the wave-inertia pump comprising a downward waterflow speed is electromechanically controlled through the control signal.

5. The method of claim 1, further comprises presetting an output productivity of the wave-inertia pump comprising a downward waterflow speed, wherein the artificial downwelling system is activated continuously in time, such that water at the surface layer is continuously released at the upwelling water layer.

6. The method of claim 1, wherein determining the deployment location comprises a central shelf between an inner shelf and an outer shelf of the coastal water body.

7. The method of claim 1, further comprises deploying a plurality of artificial downwelling systems at the deployment location geographically concentrating near at least one upwelling center along a wildfire coastline.

8. The method of claim 1, wherein the wave-inertia pump is activated continuously in time, such that the water received from the surface layer is continuously released at the upwelling water layer.

9. The method of claim 1, further comprises:
   determining a current climate at the deployment location, and,
   activating the artificial downwelling system only during arid and semi-arid periods of coastal climate at the deployment location.

10. The method of claim 1, wherein an output productivity of the wave-inertia pump comprises a downward waterflow speed predetermined before deployment.

11. The method of claim 1, wherein determining the deployment location comprises determining an oceanic side of the coastal water body comprising an upwelling front, wherein the water from the surface layer is warmer and less dense than water in the upwelling water layer, such that the coastal ocean upwelling effects are disrupted by convective-shear hydrodynamic instability and shedding mesoscale eddies.

12. The method of claim 11, further comprises receiving a control signal using a wireless communication module, such that activate or control a productivity of the wave-inertia pump to transfer the water received from the surface layer to the upwelling water layer is performed only when the control signal is received.

13. The method of claim 1, wherein the artificial downwelling system comprises a plurality of the wave-inertia pumps, deployed in at least one cluster to cooperatively inject water into the upwelling water layer.

\* \* \* \* \*